US011962989B2

(12) United States Patent
Morales et al.

(10) Patent No.: US 11,962,989 B2
(45) Date of Patent: Apr. 16, 2024

(54) MULTI-STAGE PROCESSING OF AUDIO SIGNALS TO FACILITATE RENDERING OF 3D AUDIO VIA A PLURALITY OF PLAYBACK DEVICES

(71) Applicant: ORBITAL AUDIO LABORATORIES, INC., San Juan, PR (US)

(72) Inventors: Enrique Martin Morales, Los Angeles, CA (US); Jaycen Joshua, Studio City, CA (US); Michael Seaberg, Burbank, CA (US)

(73) Assignee: ORBITAL AUDIO LABORATORIES, INC., San Juan, PR (US)

( * ) Notice: Subject to any disclaimer, the term of this patent is extended or adjusted under 35 U.S.C. 154(b) by 186 days.

(21) Appl. No.: 17/380,873

(22) Filed: Jul. 20, 2021

(65) Prior Publication Data

US 2022/0021997 A1    Jan. 20, 2022

Related U.S. Application Data

(60) Provisional application No. 63/054,183, filed on Jul. 20, 2020.

(51) Int. Cl.
*H04S 3/00* (2006.01)
*G06N 3/04* (2023.01)

(52) U.S. Cl.
CPC .............. *H04S 3/002* (2013.01); *G06N 3/04* (2013.01)

(58) Field of Classification Search
None
See application file for complete search history.

(56) References Cited

U.S. PATENT DOCUMENTS

2022/0286800 A1* 9/2022 Germain ................. H04S 3/008

FOREIGN PATENT DOCUMENTS

| EP | 1814360 A2 | 8/2007 |
|---|---|---|
| EP | 2346028 A1 | 7/2011 |
| WO | 2008/113427 A1 | 9/2008 |

OTHER PUBLICATIONS

Zotter, F. et al., "All-Round Ambisonic Panning and Decoding," JAES, AES, vol. 60, No. 10, Oct. 1, 2012, pp. 807-820.
(Continued)

*Primary Examiner* — Walter F Briney, III
(74) *Attorney, Agent, or Firm* — Pillsbury Winthrop Shaw Pittman LLP

(57) ABSTRACT

Audio signals are obtained and filtered. First and second audio processing tools are selected, and priorities associated with the first and second audio processing tools are assigned. In response to a higher priority associated with the first audio processing tool, the audio signal is encoded using the first audio processing tool. A multi-channel audio format for decoding the encoded may be selected and the encoded audio signal is decoded to the selected multi-channel audio format. Further, metadata associated with audio objects may be obtained. A gain level for each audio object may be determined based on the metadata and the gain level may be adjusted using the second audio processing tool. Another multi-channel audio format may be selected, and the gain level adjusted audio signal may be encoded based on the other selected multi-channel audio format. The gain level adjusted audio signal is output to be rendered via playback devices.

20 Claims, 12 Drawing Sheets

(56) References Cited

OTHER PUBLICATIONS

International Search Report and Written Opinion issued in corresponding International Patent Application No. PCT/US2021/042397, dated Dec. 20, 2021.

\* cited by examiner

MULTI-STAGE PROCESSING OF AUDIO SIGNALS TO FACILITATE RENDERING OF 3D AUDIO VIA A PLURALITY OF PLAYBACK DEVICES

CROSS-REFERENCE TO RELATED APPLICATIONS

This application claims the benefit of U.S. Provisional Application No. 63/054,183, entitled "Multi-Stage Processing of Audio Signals to Facilitate Rendering of 3D Audio Via a Plurality of Playback Devices," filed Jul. 20, 2020, the disclosure of which is hereby incorporated by reference in its entirety.

FIELD

The present application relates to multi-stage processing of audio signals to facilitate rendering of three-dimensional (3D) audio via a plurality of playback devices.

BACKGROUND

Traditional systems often require specialized hardware and/or software to play high quality 3D audio. Other traditional systems often have achieved limited success with regard to quality of the 3D audio and therefore, have achieved limited effects on the user experience. These and other drawbacks exist, none of which is to suggest than these approaches or any other technique are disclaimed.

SUMMARY

Aspects of the present application relate to methods, apparatuses, and/or systems facilitating multi-stage processing of audio signals to facilitate rendering of three-dimensional (3D) audio via a plurality of playback devices regardless of the hardware and/or software configuration of the playback devices.

One aspect of the disclosure relates to a system comprising circuitry configured to: obtain a plurality of audio signals; filter the plurality of audio signals, such that an audio signal, from among the plurality of audio signals, corresponding to a multi-channel audio format is allowed to pass through for further processing and one or more other audio signals, from among the plurality of audio signals, corresponding to a single-channel audio format is rejected, the audio signal including a plurality of audio objects; select, from a plurality of audio processing tools, a first audio processing tool and a second audio processing tool; assign a priority to each of the first audio processing tool and the second audio processing tool based on information associated with the first audio processing tool and the second audio processing tool, such that the audio signal is processed using an audio processing tool with a higher priority before being processing by another audio processing tool with a lower priority; in response to a higher priority being assigned to the first audio processing tool, encode, during a first stage audio process and using the first audio processing tool, the plurality of audio objects of the audio signal such that the plurality of audio objects are converted to a first multi-channel audio format, the first multi-channel format representing 3D sound fields; select a second multi-channel audio format for decoding the encoded plurality of audio objects of the audio signal, the selection of the second multi-channel format being based on a type of the second audio processing tool, and the second multi-channel audio format being distinct from the first multi-channel audio format; decode, during the first stage audio process and using the first audio processing tool, the plurality of audio objects of the audio signal, such that the plurality of audio objects of the audio signal are decoded to the second multi-channel audio format; obtain metadata associated with each of the plurality of audio objects of the audio signal, the metadata indicating a position of each of the plurality of audio objects of the audio signal in a 3D space at a given time; determine, during the second stage audio process and using the second audio processing tool, a gain level for each of the plurality of audio objects of the audio signal based on the metadata indicating the position of each of the plurality of audio objects in the 3D space at the given time; adjust, during the second stage audio process and using the second audio processing tool, the gain level of the plurality of audio objects of the audio signal; select a third multi-channel audio format for encoding gain level adjusted audio objects of the audio signal during the second stage audio process, the selection of the third multi-channel format being based on the type of the second audio processing tool; encode, during the second stage audio process and using the second audio processing tool, the gain level adjusted audio objects of the audio signal, such that the gain level adjusted audio objects of the audio signal are converted to the third multi-channel audio format; and output the gain level adjusted audio signal to be rendered via a plurality of playback devices.

One aspect of the disclosure relates to a method comprising: obtaining an audio signal, the audio signal corresponding to a multi-channel audio format; selecting, from a plurality of audio processing tools, a first audio processing tool and a second audio processing tool; assigning a priority to each of the first audio processing tool and the second audio processing tool; selecting a first multi-channel audio format based on information associated with the second audio processing tool; in response to a higher priority being assigned to the first audio processing tool, processing, during a first stage audio process, the audio signal using the first audio processing tool, the processing of the audio signal using the first audio processing tool including converting the audio signal to the selected first multi-channel audio format; obtaining metadata associated with the audio signal; selecting a second multi-channel audio format based on information associated with the second audio processing tool, the second multi-channel audio format being distinct from the first multi-channel audio format; processing, during a second stage audio process, the converted audio signal using the second audio processing tool and based on the metadata, the processing of the converted audio signal using the second audio processing tool including converting the audio signal to the selected second multi-channel audio format; and outputting the audio signal in the second multi-channel audio format to be rendered via a plurality of playback devices.

Another aspect of the disclosure relates to non-transitory computer readable media. The non-transitory computer readable media may store instructions that, when executed by one or more processors, effectuate operations comprising: obtaining an audio signal, the audio signal corresponding to a multi-channel audio format; selecting, from a plurality of audio processing tools, a first audio processing tool and a second audio processing tool; assigning a priority to each of the first audio processing tool and the second audio processing tool; selecting a first multi-channel audio format based on information associated with the second audio processing tool; in response to a higher priority being assigned to the first audio processing tool, processing, during a first stage audio process, the audio signal using the first audio processing tool, the processing of the audio signal using the first audio processing tool including converting the audio signal to the selected first multi-channel audio format; obtaining metadata associated with the audio signal; selecting a second multi-channel audio format based on information associated with the second audio processing tool, the second multi-channel audio format being distinct from the first multi-channel audio format; processing, during a second stage audio process, the converted audio signal using the second audio processing tool and based on the metadata, the processing of the converted audio signal using the second audio processing tool including converting the audio signal to the selected second multi-channel audio format; and outputting the audio signal in the second multi-channel audio format to be rendered via a plurality of playback devices.

Various other aspects, features, and advantages of the present application will be apparent through the detailed description of the present application and the drawings attached hereto. It is also to be understood that both the foregoing general description and the following detailed description are examples and not restrictive of the scope of the present application. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the present application. It will be appreciated, however, by those having skill in the art that the embodiments of the present application may be practiced without these specific details or with an equivalent arrangement. In other cases, well-known structures and devices are shown in block diagram form in order to avoid unnecessarily obscuring the embodiments of the present application.

Figure 1A:
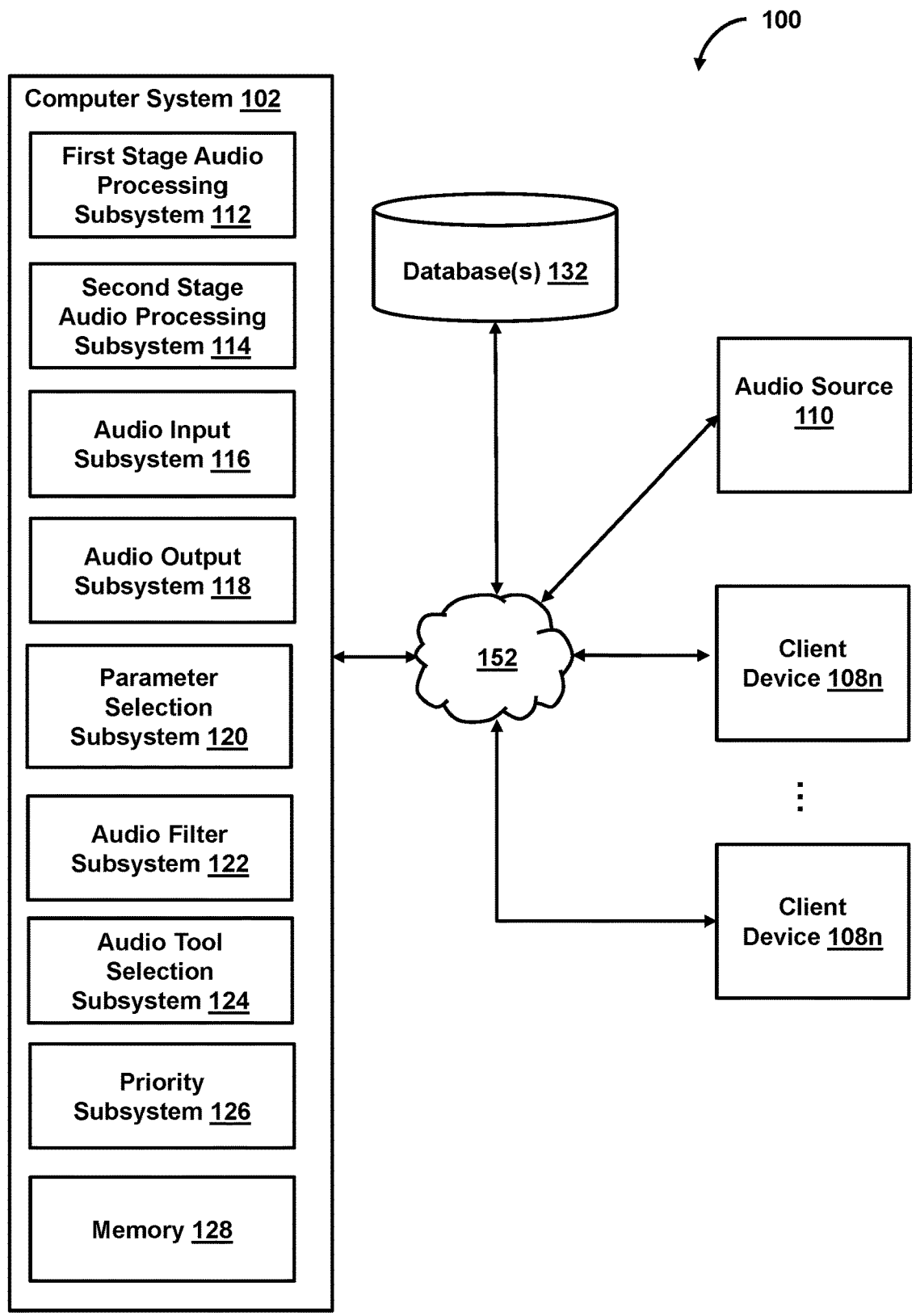
FIG. 1A shows a system for multi-stage processing of audio signals to facilitate rendering of three-dimensional (3D) audio via a plurality of playback devices, in accordance with one or more embodiments.

FIG. 1A shows a system 100 for facilitating multi-stage processing of audio signals to facilitate rendering of three-dimensional (3D) audio via a plurality of playback devices. As shown in FIG. 1A, system 100 may include computer system 102 (e.g., one or more servers, processors, audio processors), client device 108 (or client devices 108a-108n), audio source 110, database 132, or other components. Computer system 102 may include a first stage audio processing subsystem 112, second stage audio processing subsystem 114, audio input subsystem 116, audio output subsystem 118, parameter selection subsystem 120, audio filter subsystem 122, audio tool selection subsystem 124, priority subsystem 126, memory 128, or other components.

Client device 108 (also referred to as a physical device, a physical client device, user device, or playback device) may include any type of mobile terminal, fixed terminal, or other device. By way of example, client device 108 may include a desktop computer, a notebook computer, a tablet computer, a smartphone, a wearable device, a playback device (e.g., headphone(s), loudspeakers, etc.), or other physical client device. Audio source 110 may include one or more microphones, a recorder, a client device 108, etc.

Users may, for instance, use one or more client devices 108 to interact with one another, one or more computer systems 102, or other components of system 100. It should be noted that, while one or more operations are described herein as being performed by components of computer system 102, those operations may, in some embodiments, be performed by components of client device 108 or other components of system 100 and while one or more operations are described herein as being performed by components of client device 108, those operations may, in some embodiments, be performed by components of computer system 102 or other components of system 100.

In some embodiments, the computer system 102 (e.g., audio input subsystem 116) may obtain a plurality of audio signals. The audio signals may correspond to a single channel format (e.g., mono) and/or multi-channel format (e.g., stereo, binaural, surround, ambisonics, etc.). The plurality of audio signals may be obtained from one or more audio sources 110. Although only one audio source 110 is illustrated, it should be understood there may be a plurality of audio sources 110 from which one or more audio signals may be obtained by the computer system 102. The audio signals may correspond to music signals, gaming signals, video signals, sports broadcast signals, etc. The computer system 102 (e.g., audio filter subsystem 122) may filter the plurality of audio signals, such that one or more of the audio signals are further processed and other audio signals are not processed. For example, the audio filter subsystem 122 may accept multi-channel audio signals and may reject non-multi-channel audio signals. In other words, the audio filter subsystem 122 may only select a specific type of audio signals (e.g., multi-channel audio signals) to be further processed, while the other audio signals (e.g., non multi-channel audio signals) are rejected. Alternatively, the audio filter subsystem 122 may select one or more non multi-channel audio signals for further processing, while rejecting the multi-channel audio signals. The audio signals may include a plurality of audio objects corresponding to a stream of audio data and the audio objects may be manipulated to enhance the audio signals. Filtering and other transformations on audio signals may be implemented by creating a new copy of the audio signal or by editing an extant copy. Use of the definite article to reference an antecedent is generic to both examples, e.g., reference to "a audio signal" that is modified and followed by reference to "the audio signal" does not preclude "the audio signal" being based on a new copy subject to the modification.

In some embodiments, the audio tool selection subsystem 124 may select one or more audio processing tools from a plurality of audio processing tools. For example, the audio tool selection subsystem 124 may select at least two audio processing tools. Selecting at least two audio processing tools (e.g., in order to process an audio signal using at least two audio processing tools) is expected to enhance the audio quality of the audio signals rendered or played via a plurality of playback devices (e.g., client devices 108) regardless of the hardware and/or software associated with the plurality of playback devices, which is not to suggest that this technique or any other is required in all embodiments. The selection of one audio processing tool may be dependent on the selection of another audio processing tool. In some cases, a second audio processing tool may be selected based on a selection of a first audio processing tool. Examples of audio processing tools include, but are not limited to (which is not to suggest that other lists are limiting), tools related to Ambisonics, Dolby Atmos, Sony 360, Dear VR, Pro Tools, Orbital Audio, etc. A first audio processing tool may be selected based on a request or criteria. For example, computer system 102 (e.g., audio tool selection subsystem 124) may recognize that the obtained audio signal has not been spatialized and based on this recognition, computer system 102 (e.g., audio tool selection subsystem 124) may select one or more audio processing tools that perform spatialization (e.g., three-dimensional (3D) spatialization). In some cases, the computer system 102 (e.g., audio tool selection subsystem 124) may analyze the audio signal and determine an audio processing tool based on the analyzed audio content of the audio signal. For example, computer system 102 (e.g., audio tool selection subsystem 124) may determine that the audio signal has not been spatialized and accordingly, the computer system 102 may select a first audio processing tool (e.g., Ambisonics) for performing 3D spatialization and may select a second audio processing tool (e.g., Dolby Atmos) based on the selection of the first audio processing tool in order to complement and supplement the first audio processing tool in order to enhance the processing of the audio signal performed by the first audio processing tool. In some cases, the selection is automatic and done without human intervention. The selection of the audio processing tools may also be based on a format associated with the audio signal. In other words, computer system 102 (e.g., audio selection tool) may select the audio processing tools based on whether the audio signal is a single-channel audio format or a multi-channel audio format. In addition to the selection of a first audio processing tool and a second audio processing tool and processing of the audio signal using the selected audio processing tools, it should be understood that the selected audio processing tools may be used in conjunction with one or more other audio processing tool (e.g., Pro Tools).

Figure 2:
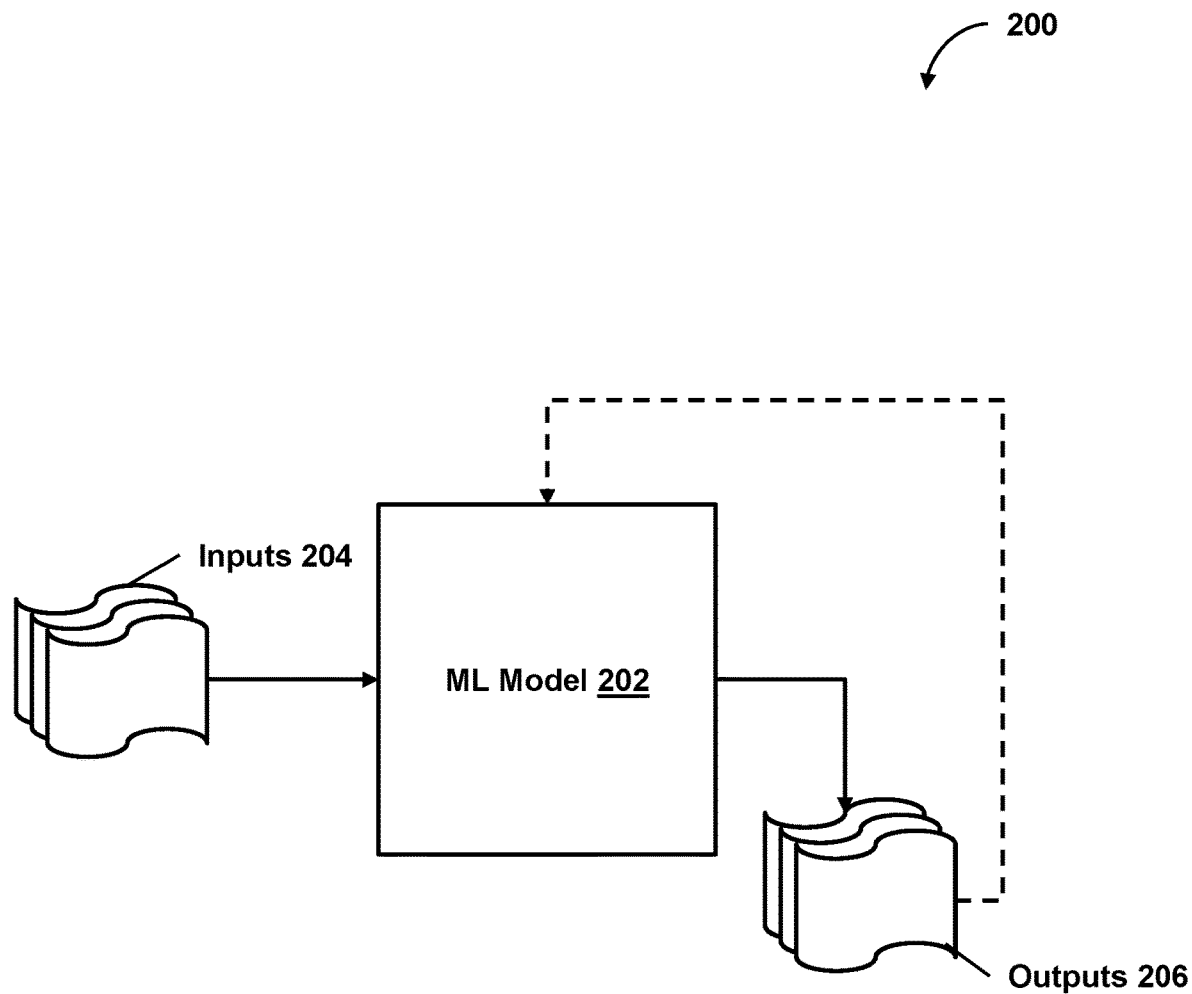
FIG. 2 shows a machine learning model configured to facilitate rendering of three-dimensional (3D) audio via a plurality of playback devices, in accordance with one or more embodiments.

In some embodiments, the selection of the audio processing tools may be performed by one or more prediction models (e.g., machine learning models, neural networks, etc.). FIG. 2 shows a machine learning model system 200 for making predictions that facilitate rendering of 3D audio via a plurality of playback devices regardless of the hardware or software installed or associated with such playback devices, in accordance with one or more embodiments. As an example, a machine learning model 202 may take inputs 204 and provide outputs 206. In one use case, outputs 206 may be fed back (e.g., active feedback) to machine learning model 202 as input to train machine learning model 202 (e.g., alone or in conjunction with user indications of the accuracy of outputs 206, labels associated with the inputs 204, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights and perceptron biases may be adjusted to reconcile differences between the neural network's prediction and the reference feedback, for instance, by computing a partial derivative of each such parameter with respect to an objective function to determine a direction in parameter space to adjust the model to locally optimize the model according to the objective function In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions. Other suitable models may include decision trees, such as a random forest decision tree model. These models may be trained with the Classification and Regression Tree (CART) algorithm. In some cases, an input space may be recursively bisected on each of five or ten or more input space dimensions, selecting bisecting values in each respective dimension that minimis a measure impurity in outcomes (e.g., entropy or Gini impurity) in a training set on each volume in the space separated by the value.

For example, in some embodiments, inputs 204 may comprise audio signals (e.g., audio signal patterns) and/or information or content included in (or missing from) the audio signal (e.g., an indication of information or content included in (or missing from) the audio signal). The reference feedback information (e.g., outputs 206), which may be fed back as input to the machine learning model 202, may include one or more audio processing tools (e.g., one or more identifications associated with the audio processing tools) that are associated with the processing of the audio signal and/or information or content included in (or missing from) the audio signal, to train machine learning model 202. Accordingly, when a particular audio signal and/or information or content included in (or missing from) the audio signal is provided as input 204 to machine learning model 202, machine learning model 202 may provide an output 206 including an identification of one or more audio processing tools. In some embodiments, system 100 may include multiple models that are trained to output different predictions (e.g., as described above or other predictions).

In some embodiments, a selection of an audio processing tool may correspond to a selection of an identification associated with the audio processing tool. Accordingly, in response to a selection of an identification associated with each of the first audio processing tool and the second audio processing tool, the computer system 102 may retrieve such audio processing tools from memory 128 and/or database 132. If the audio processing tools are not found to be in memory 128 and/or database 132, the computer system 102 may retrieve such audio processing tools from another source (e.g., an external source). In some embodiments, the computer system 102 may update one or more of the audio processing tools. For example, computer system 102 may determine that a newer version of one or more audio processing tools is available, and may automatically update such audio processing tools based on such new version(s).

In some embodiments, computer system 102 (e.g., priority subsystem 126) my assign a respective priority to each of a plurality of audio processing tools. Such priority may determine an order in which an audio signal is processed. In some embodiments, an audio processing tool associated with a higher priority is used to process an audio signal before the audio signal is processed using another audio processing tool associated with a lower priority. Computer system 102 (e.g., priority subsystem 126) may assign a priority to the selected audio processing tools, for example, based on a type (e.g., audio format) of the audio signal obtained from the audio source 110 and/or based on content or information included in (or missing from) the audio signal. For example, in response to a determination that the obtained audio signal is a multi-channel audio signal and/or a determination that the obtained audio signal has not been spatialized, the computer system 102 (e.g., priority subsystem 126) may assign a higher priority to a first audio processing tool (e.g., Ambisonics™) selected by the computer system 102 and a lower priority to a second audio processing tool (e.g., Dolby Atmos™) selected by the computer system 102. Such priority may be assigned such that the audio processing tool associated with a higher priority (e.g., a first audio processing tool) processes the audio signal before the audio signal is processed by another audio processing tool associated with a lower priority (e.g., a second audio processing tool). The assignment of priority may be beneficial because this may determine which audio processing tool processes the audio signal first. The order of processing of the audio signal may be relevant as this, in some cases, determines the ultimate quality of the 3D sound that is output by the computer system 102. In addition, the priority of processing the audio signal is relevant in some cases because it may allow the audio signal to be processed in multiple stages such that the audio signal can be played back via any playback device regardless of the software and/or hardware configuration of the playback device. In some embodiments, as opposed to other systems that require specialized hardware and/or software in order to play high quality 3D sound (which is not to suggest that specialized hardware or software is disclaimed, or that anything else is disclaimed elsewhere in this document), no specialized hardware and/or software is needed in some cases, in order to playback high quality 3D sound processed by some embodiments (e.g., via the multi-stage processing of the audio signals) of the present disclosure.

In some embodiments, the priority may be assigned to a plurality of audio processing tools prior to the selection of the first and second audio processing tools described above. Specifically, the computer system 102 (e.g., priority subsystem 126) may prioritize the audio processing tools and may store the priority associated with such audio processing tools in the memory 128 and/or database 132. In some embodiments, each of the plurality of audio processing tools may be associated with different priorities. In some embodiments, the computer system 102 (e.g., priority subsystem 126) may create a plurality of priority lists (e.g., priority lists associated with different types of audio signals and/or different types of information or content included in (or missing from) the audio signals). For example, computer system 102 (e.g., priority subsystem 126) may create a first priority list corresponding to audio signals associated with a single channel format and a second priority list corresponding to audio signals associated with a multi-channel format. In some embodiments, the first priority list (e.g., corresponding to audio signals associated with a single channel format) may associate a second audio processing tool (e.g., Dolby Atmos™) with a higher priority than a first audio processing tool (e.g., Ambisonics™) and the second priority list (e.g., corresponding to audio signals associated with a multi-channel format) may associate the first audio processing tool (e.g., Ambisonics™) with a higher priority than a second audio processing tool (e.g., Dolby Atmos™).

In some embodiments, as noted above, the priority may also be determined and assigned based on content or information included (or missing) from the audio signals. For example, the computer system 102 may create a first priority list corresponding to audio signals that are missing 3D spatialization signals and a second priority list corresponding to audio signals that include 3D spatialization signals. In some embodiments, the first priority list (e.g., corresponding to audio signals that are missing 3D spatialization signals) may associate the first audio processing tool (e.g., Ambisonics™) with a higher priority than a second audio processing tool (e.g., Dolby Atmos™) and the second priority list (e.g., corresponding to audio signals that include 3D spatialization signals) may associate a second audio processing tool (e.g., Dolby Atmos™) with a higher priority than a first audio processing tool (e.g., Ambisonics™).

In some embodiments, the audio signal (which may include a plurality of audio objects) is processed based on the selected audio processing tools and the priority associated with such audio processing tools, such that an audio processing tool associated with a higher priority is used for processing the audio signal before another audio processing tool is used for processing the audio signal. In some embodiments, the order in which the audio signal is processed is determined based on the selection of the audio processing tools and the priority assigned (or associated) with such audio processing tools.

In some embodiments, in response to a selection of a first audio processing tool and in response to a determination that the first audio processing tool is associated with a higher priority than a second audio processing tool, the audio signal is first processed using the first audio processing tool. Specifically, during a first stage audio process, the computer system 102 (e.g., the first stage audio processing subsystem 112) may encode the audio signal (including the plurality of audio objects) using the first audio processing tool during the first stage audio process. The encoding of the audio signal may convert the audio signal to a multi-channel format (e.g., a channel format different than the channel format corresponding to the audio signal obtained from the audio source 110). Such a multi-channel format may include representing the audio signal (and the audio objects) as 3D sound fields. In some cases, such a multi-channel format (e.g., B-format) may represent 3D sound fields.

In some embodiments, the computer system 102 (e.g., parameter selection subsystem 120) may select a multi-channel format (from a plurality of multi-channel formats, e.g., stereo, binaural, surround, 5.1, 7.1, 9.1, 7.1.2, etc.) to decode the encoded audio signal (including the audio objects). The selection of the multi-channel format may be based on the selected second audio processing tool. In some cases, the computer system 102 (e.g., parameter selection subsystem 120) may select a multi-channel format that is compatible with the selected second audio processing tool such that the second processing tool may process the audio signal in a format compatible with the second audio processing tool. In some embodiments, a plurality of multi-channel formats may be compatible with the second audio processing tool. In such a case, in some embodiments, the computer system 102 (e.g., parameter selection subsystem 120) may select a multi-channel format associated with the highest priority from among the plurality of multi-channel formats that are compatible with the second audio processing tool. The priority associated with the plurality of multi-channel formats that are compatible with the second audio processing tool may be based on the selected second audio processing tool. In some cases, processing of certain multi-channel formats by the second processing tool is expected to result in better sound quality, and therefore, the priority of the plurality of multi-channel formats may be based on performance of the different multi-channel formats (e.g., when rendered via a plurality of playback devices) processed using the second audio processing tool. The selected multi-channel format may be different from the multi-channel format associated with the encoded audio signal.

In some embodiments, the selection of the multi-channel format may be performed by one or more prediction or classification models (e.g., machine learning models, like neural networks, decision trees, dynamic Bayesian networks, reinforcement learning models, etc.). FIG. 2 shows a machine learning model system 200 for making predictions that facilitate rendering of 3D audio via a plurality of playback devices regardless of the hardware or software installed or associated with such playback devices, in accordance with one or more embodiments. As an example, a machine learning model 202 may take inputs 204 and provide outputs 206. In some embodiments, outputs 206 may be fed back (e.g., active feedback) to machine learning model 202 as input to train machine learning model 202 (e.g., alone or in conjunction with user indications of the accuracy of outputs 206, labels associated with the inputs 204, or with other reference feedback information). In some embodiments, machine learning model 202 may update its configurations (e.g., weights, biases, or other parameters) based on its assessment of its prediction (e.g., outputs 206) and reference feedback information (e.g., user indication of accuracy, reference labels, or other information). In some embodiments, where machine learning model 202 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

For example, in some embodiments, inputs 204 may comprise an identification of an audio processing tool (e.g., an identification of the first audio processing tool and/or an identification of the second audio processing tool). The reference feedback information (e.g., outputs 206), which may be fed back as input to the machine learning model 202, may include one or more multi-channel formats (e.g., stereo, binaural, surround, 5.1, 7.1, 9.1, 7.1.2, etc.) (e.g., identification of the one or more multi-channel formats) associated with the identification of the audio processing tools to train machine learning model 202. Accordingly, when a particular identification of an audio processing tool is provided as input 202 to machine learning model 202, machine learning model 202 may provide an output 206 including an identification of one or more multi-channel formats. In some embodiments, system 100 may include multiple models that are trained to output different predictions (e.g., as described above or other predictions).

In some embodiments, the computer system 102 (e.g., the first stage audio processing subsystem 112) may decode the encoded audio signal (including the encoded plurality of audio objects) using the first audio processing tool during the first stage audio process. The encoded audio signal may be decoded such that the encoded audio signal is converted (or decoded) to the selected multi-channel format discussed above.

In some embodiments, metadata associated with the audio signal (e.g., metadata associated with each of the plurality of audio objects) may be obtained. The metadata may include a position of each of the plurality of audio objects of the audio signal in a 3D space at a given time. In some embodiments, the computer system 102 (e.g., the second stage audio processing subsystem 114) may determine a gain level for each of the plurality of audio objects of the audio signal using the second audio processing tool based on the metadata indicating a position of each of the plurality of audio objects of the audio signal in a 3D space at a given time. This may be performed during the second stage audio process by the second stage audio processing subsystem 114. The computer system 102 (e.g., the second stage audio processing subsystem 114) may adjust the gain level of the plurality of audio objects using the second audio processing tool and during the second stage audio process. The metadata may further include information for mapping an audio object position to a reproduction environment, data for constraining a position of an audio object to one-dimensional curve or a two-dimensional surface, trajectory data for an audio object indicating a time-variable position of the audio object with the 3D space, and/or speaker zone constraint (including data for disabling selected speaker, e.g., virtual speakers in a 3D space). In addition to or alternative to adjusting the gain level, the computer system 102 (e.g., the second stage audio processing subsystem 114) may create an aggregate gain based on one or more desired audio object positions, a distance from the desired audio object position to a reference position, a velocity of an audio object or an audio object content type. The computer system 102 (e.g., the second stage audio processing subsystem 114) may control audio object spread in one or more of three-dimensions. The computer system 102 (e.g., the second stage audio processing subsystem 114) may also map audio object locations to planes of speaker arrays (e.g., virtual speakers in 3D space) of a reproduction environment.

In some embodiments, the computer system 102 (e.g., parameter selection subsystem 120) may select another multi-channel format (from a plurality of multi-channel formats, e.g., stereo, binaural, surround, 5.1, 7.1, 9.1, 7.1.2, etc.) in order to encode the gain level adjusted audio signal (e.g., gain level adjusted audio objects). The selection of the multi-channel format may be based on several factors including, but not limited to (which is not to suggest that other lists herein are limiting), the selected second audio processing tool, the above-discussed selected multi-channel format for decoding the encoded audio signal, a type of audio signal (e.g., audio channel format of the audio signal), and/or information or content included in (or missing from) the audio signal. The computer system 102 (e.g., parameter selection subsystem 120) may select a multi-channel format that is compatible with a plurality of playback devices. The selected multi-channel format may be different from (or the same as) the multi-channel format associated with the encoded audio signal and/or the multi-channel format associated with the decoded audio signal. The selection of the multi-channel format in order to encode the gain level adjusted audio signal may be based on a format that may be playable via any playback device, regardless of the hardware and/or software configuration of such a playback device.

In some embodiments, the selection of the multi-channel format may be performed by one or more prediction models (e.g., machine learning models, neural networks, etc.). FIG. 2 shows a machine learning model system 200 for making predictions that facilitate rendering of 3D audio via a plurality of playback devices regardless of the hardware or software installed or associated with such playback devices, in accordance with one or more embodiments. As an example, a machine learning model 202 may take inputs 204 and provide outputs 206. In some embodiments, outputs 206 may be fed back (e.g., active feedback) to machine learning model 202 as input to train machine learning model 202 (e.g., alone or in conjunction with user indications of the accuracy of outputs 206, labels associated with the inputs 204, or with other reference feedback information). In some embodiments, machine learning model 202 may update its configurations (e.g., weights, biases, or other parameters) based on its assessment of its prediction (e.g., outputs 206) and reference feedback information (e.g., user indication of accuracy, reference labels, or other information). In some embodiments, where machine learning model 202 is a neural network, connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

For example, in some embodiments, inputs 204 may comprise an identification of an audio processing tool (e.g. an identification of the first audio processing tool and/or an identification of the second audio processing tool), an identification of the above-discussed selected multi-channel format for decoding the encoded audio signal, an identification of a type of audio signal (e.g., a channel format of the audio signal), and/or identification of information or content included in (or missing from) the audio signal. The reference feedback information (e.g., outputs 206), which may be fed back as input to machine learning model 202, may include one or more multi-channel formats (e.g., stereo, binaural, surround, 5.1, 7.1, 9.1, 7.1.2, etc.) associated with an identification of the above-discussed selected multi-channel format for decoding the encoded audio signal, an identification of a type of audio signal (e.g., a channel format of the audio signal), and/or identification of information or content included in (or missing from) the audio signal, to train machine learning model 202. Accordingly, when a particular identification of an audio processing tool,), an identification of the above-discussed selected multi-channel format for decoding the encoded audio signal, an identification of a type of audio signal, and/or identification of information or content included in (or missing from) the audio signal is provided as input 202 to machine learning model 202, machine learning model 202 may provide an output 206 including an identification of one or more multi-channel formats. In some embodiments, system 100 may include multiple models that are trained to output different predictions (e.g., as described above or other predictions).

In some embodiments, the gain level adjusted audio signal (e.g., gain level adjusted audio objects) may be encoded such that the gain level adjusted audio signal is converted to the selected multi-channel format. In some embodiments, the computer system 102 (e.g., the second stage audio processing subsystem 114) may encode the gain level adjusted audio signal (e.g., gain level adjusted audio objects) using the second audio processing tool during the second stage audio process such that the gain level adjusted audio signal is converted to the selected multi-channel format. In some embodiments, the computer system 102 (e.g., the audio output subsystem 118) may output the encoded audio signal (e.g., the encoded gain level adjusted audio signal) so that the encoded audio signal is playable via a plurality of playback devices.

In some embodiments, the computer system 102 may include a display and a user interface and one or more steps described herein may be performed via such a user interface. For example, the selection of audio processing tools, filtering of audio signals, and/or assignment of priority may be performed via a user interface (e.g., based on one or more inputs from a user via a user interface).

Embodiments are expected to have various advantages, though embodiments are not limited to implementations affording all such advantages. First, the above-noted description of performing multi-stage audio processing (including the selection of multi-channel audio formats, assigning and/or determining priority associated with audio processing tools and/or multi-channel audio formats) is expected to facilitate the rendering of 3D sound via a plurality of playback devices regardless of the hardware and/or software configuration of the playback devices. As noted above, in some other systems, hardware and/or software configuration of a playback device is necessary in order to enable playback of 3D sounds. However, the above-noted multi-stage audio processing of the present disclosure is expected to enable the rendering of 3D sound via a plurality of playback devices regardless of the hardware and/or software configuration of the playback devices. Second, despite being able to play the audio signal (e.g., the 3D sound) via a plurality of playback devices, the quality of the audio is expected to be not diminished. Indeed, it is expected that performing the above-noted multi-stage audio processing will enhance the quality of the sound played back via a plurality of different playback devices.

Figure 1B:
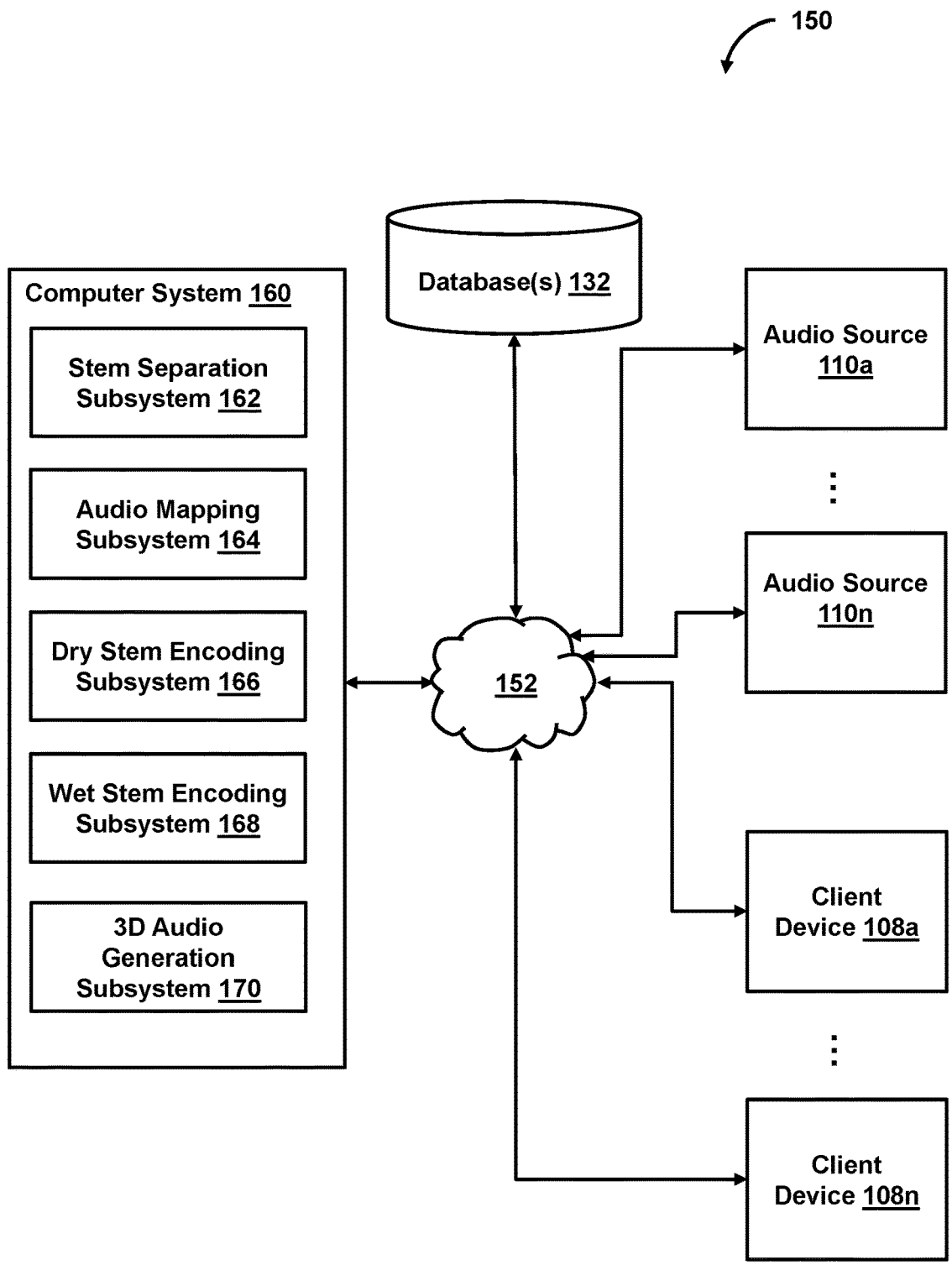
FIG. 1B shows another system for processing audio signals to facilitate rendering of three-dimensional (3D) audio via a plurality of playback devices, in accordance with one or more embodiments.

FIG. 1B shows another system 150 for processing audio signals to facilitate rendering of three-dimensional (3D) audio via a plurality of playback devices, in accordance with one or more embodiments. System 150 may include a computer system 160, database 132, audio sources 110a-110n (collectively referred to as "audio sources 110" and individually referred to as "audio source 110"), client devices 108a-108n (collectively referred to as "client devices 108" and individually referred to as "client device 108"), or other components. In some embodiments, computer system 160 may include one or more of subsystems 112-126, memory 128, or other components of computer system 102. Furthermore, database 132, audio source(s) 110, client device(s) 108, network 152, and other features of system 100, may be the same or similar to those same features of system 150.

Figure 3:
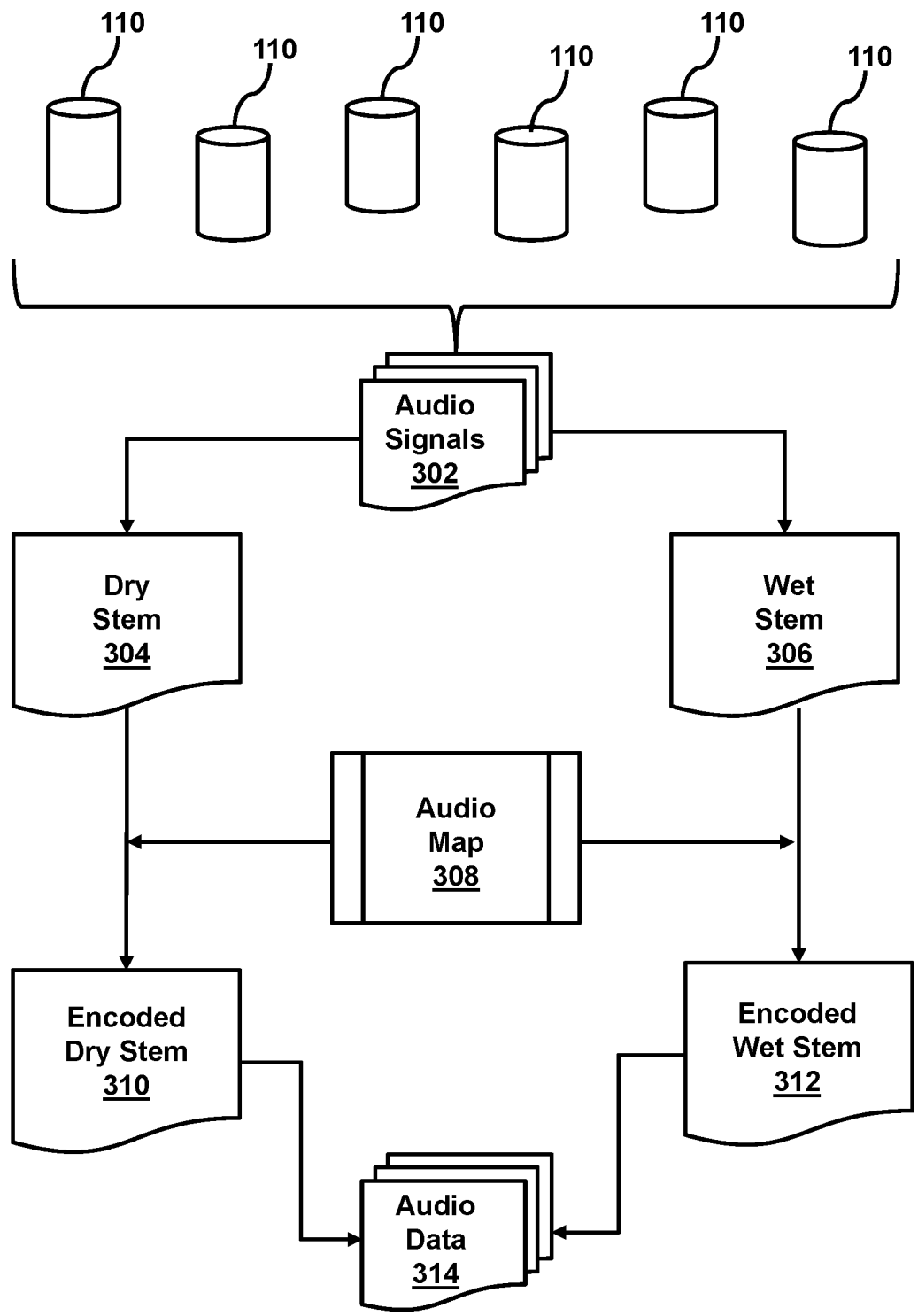
FIG. 3 shows a diagram of a process for rendering three-dimensional (3D) audio based on a plurality of audio signals output by one or more audio sources, in accordance with one or more embodiments.

In some embodiments, stem separation subsystem 162 may be configured to obtain a plurality of audio signals from one or more audio sources 110. As an example, with reference to FIG. 3, audio sources 110 may output audio signals 302. Audio signals 302 may correspond to a single channel format (e.g., mono) and/or multi-channel format (e.g., stereo, binaural, surround, ambisonics, etc.). Audio signals 302 may correspond to music signals, gaming signals, video signals, sports broadcast signals, etc. In some embodiments, audio signals 302 may be filtered, or correspond to filtered audio signals. Audio signals 302 may include a plurality of audio objects corresponding to a stream of audio data and the audio objects may be manipulated to enhance audio signals 302.

After audio signals 302 are obtained from audio sources 110, stem separation subsystem 162 may be configured to identify which audio signals from audio signals 302 include one or more audio effects. An example of an audio effect includes hardware or software devices that manipulate one or more aspects of a given audio signal. Some example audio effects include a phaser effect, a reverberation (reverb) effect, a delay effect, an echoing effect, a distortion effect, or other audio effects, or combinations thereof. In some embodiments, audio signals 302 may be analyzed to determine whether any audio effects are present. Audio signals including one or more audio effects may be classified into particular clusters, tagged with an identifier corresponding to a type of audio effect present in the audio signal, filtered out from the remaining audio signals, or a combination thereof. For example, with reference to FIG. 3, audio signals 302 determined to not have an audio effect may be segmented into a group of audio signals, referred to as a dry stem 304, whereas audio signals 302 determined to have an audio effect may be segmented into another group of audio signals, referred to as a wet stem 306.

Figure 4:
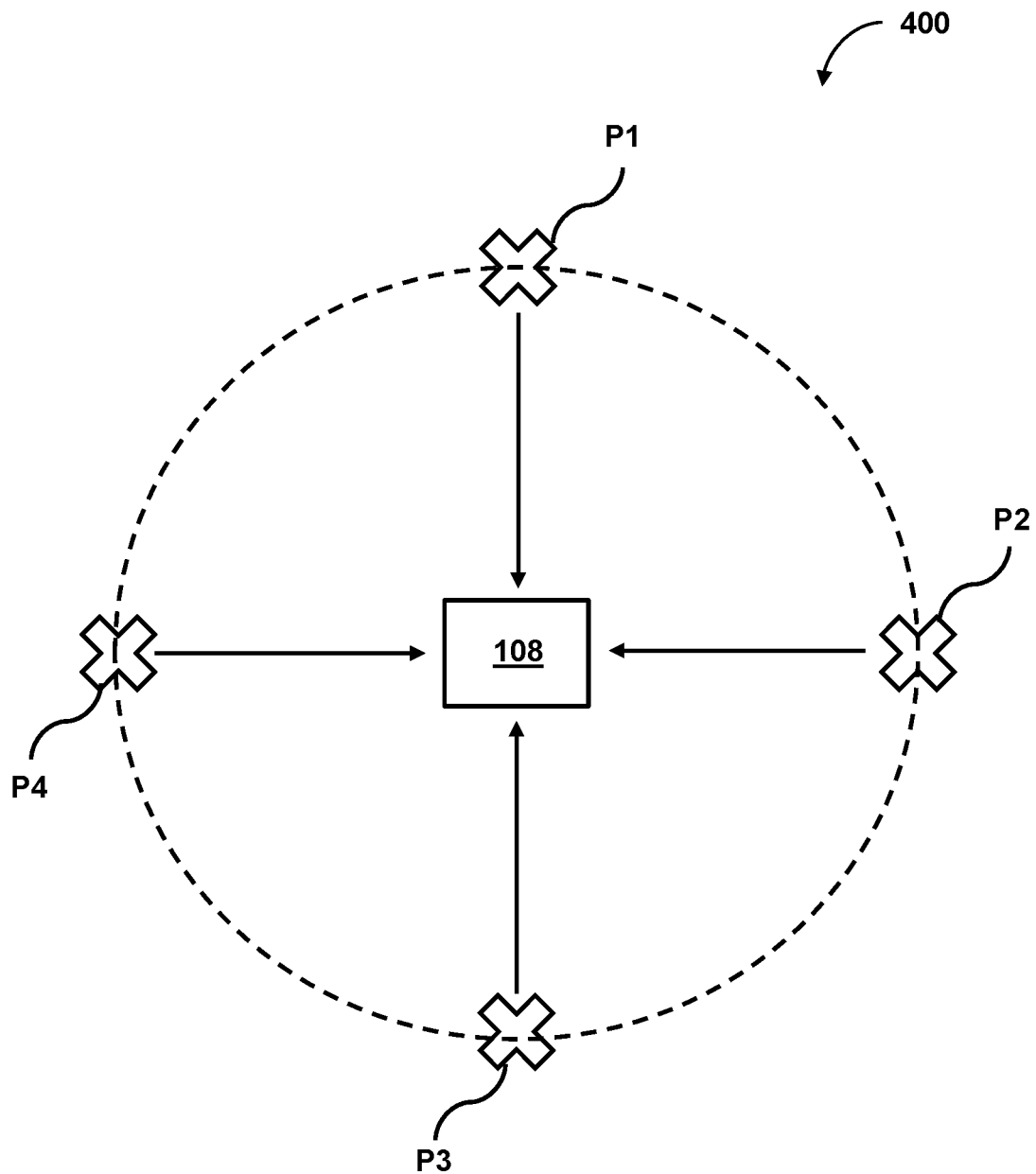
FIG. 4 shows a diagram of virtual locations from where audio is to appear to emanate, in accordance with one or more embodiments.

In some embodiments, audio mapping subsystem 164 may be configured to determine or generate an audio mapping for dry stem 304 (e.g., files other audio objects without added effects) and the wet stem 306 (e.g., files or other audio objects with added effects). For example, with reference to FIG. 3, audio map 308 may be generated or retrieved from database(s) 132, and used to determine what modifications and/or enhancements are to be applied to dry stem 304, wet stem 306, or both. Audio map 308 may include metadata associated with dry stem 304, wet stem 306, or both. In some cases, the metadata may include an association of each component of dry stem 304 with each of a plurality of audio objects. For example, the metadata may include a position of each of the plurality of audio objects of the audio signal in a 3D space at a given time. For example, with reference to FIG. 4, 3D space 400 includes a plurality of audio objects, denoted by the "X"s, each of which is located at a different virtual location (e.g., virtual location P1, virtual location P2, virtual location P3, virtual location P4) in 3D space 400. In some embodiments, 3D space 400 of FIG. 4 represents an X-Y plane including virtual locations P1-P4 about the X-Y plane, whereby the azimuthal dimension is into and out of the page. In some embodiments, audio map 308 may be determined to include, or generated to indicate, a gain level for each of the plurality of audio objects of dry stem 304, wet stem 306, or both. Audio map 308 may include the metadata indicating a position (e.g., virtual locations P1-P4) of each of the plurality of audio objects at a given time. The metadata included by audio map 308 may indicate one or more adjustments to a gain (e.g., a gain level) associated with each of the plurality of audio objects. The metadata may further include information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position of the audio object with 3D space 400, and/or speaker zone constraint (including data for disabling selected speaker, e.g., virtual speakers in a 3D space), or other information. In addition to or as alternative to adjusting the gain level, audio map 308 may include instructions to cause computer system 160 to create an aggregate gain based on one or more desired audio object positions within 3D space 400, a distance from the desired audio object position to a reference position (e.g., a virtual location of client device 108 within 3D space 400), a velocity of an audio object or an audio object content type, or other criteria, or a combination thereof. Audio map 308 may further include instructions by which computer system 160 controls audio object spread in one or more of three-dimensions, and/or include data for mapping audio object locations (e.g., virtual locations P1-P4) to planes of speaker arrays (e.g., virtual speakers in 3D space 400) of a reproduction environment.

Dry stem encoding subsystem 166 may be configured to encode dry stem 304 to obtain an encoded dry stem. For example, with reference again to FIG. 3, dry stem encoding subsystem 166 may generate encoded dry stem 310 based on dry stem 304 and audio map 308. In some embodiments, encoded dry stem 310 represents dry stem 304 including one or more modifications. Encoding dry stem 304 may include dry stem encoding subsystem 166 adding metadata included in audio map 308 to dry stem 304. The metadata may include an association of each component of dry stem 304 with each of a plurality of audio objects. For example, as mentioned above with reference to FIG. 4, 3D space 400 includes a plurality of audio objects (e.g., the "X"s located at a virtual locations P1-P4 in 3D space 400). In some embodiments, encoding dry stem 304 may also include associating dry stem 304 with a gain level for each of the plurality of audio objects. For example, the metadata may indicate a position (e.g., virtual locations P1-P4) of each of the plurality of audio objects at a given time, one or more adjustments to a gain (e.g., a gain level) associated with each of the plurality of audio objects, information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position of the audio object with 3D space 400, and/or speaker zone constraint (including data for disabling selected speaker, e.g., virtual speakers in a 3D space), or other information. In addition to or alternative to adjusting the gain level, encoding dry stem 304 may include adding an aggregate gain based on one or more desired audio object positions within 3D space 400, a distance from the desired audio object position to a reference position (e.g., a virtual location of client device 108 within 3D space 400), a velocity of an audio object or an audio object content type, or other criteria, or a combination thereof. Still further, encoding dry stem 304 may further include adding instructions to dry stem 304 to control audio object spread in one or more of three-dimensions, and/or adding data for mapping audio object locations (e.g., virtual locations P1-P4) to planes of speaker arrays (e.g., virtual speakers in 3D space 400) of a reproduction environment.

Figure 5A:
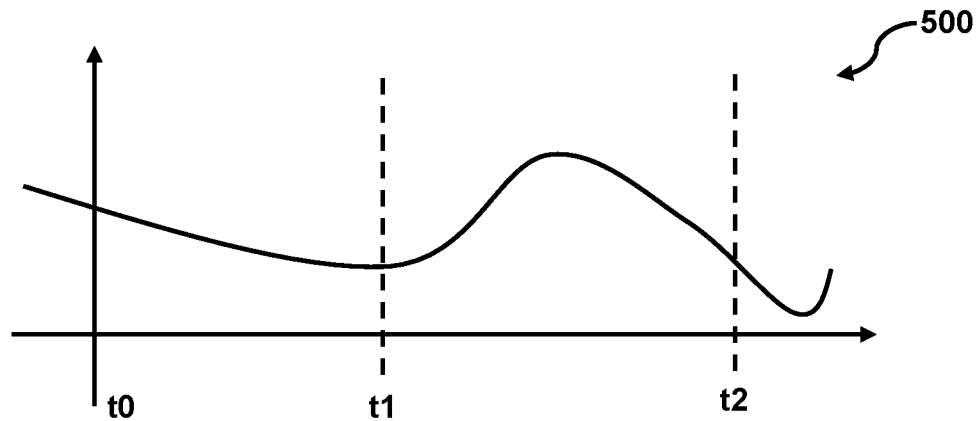
FIGS. 5A-5C show diagrams of automation being applied to a dry stem, in accordance with one or more embodiments.
Figure 5B:
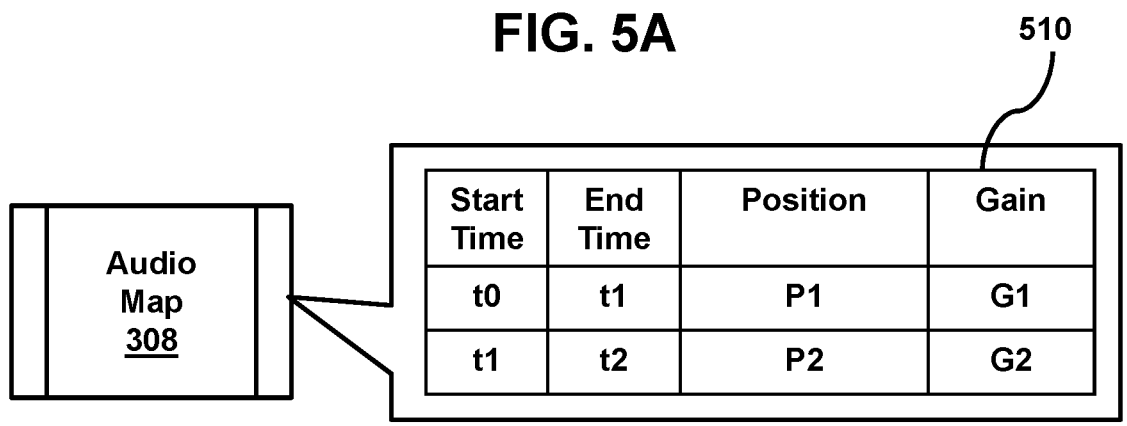
Figure 5C:
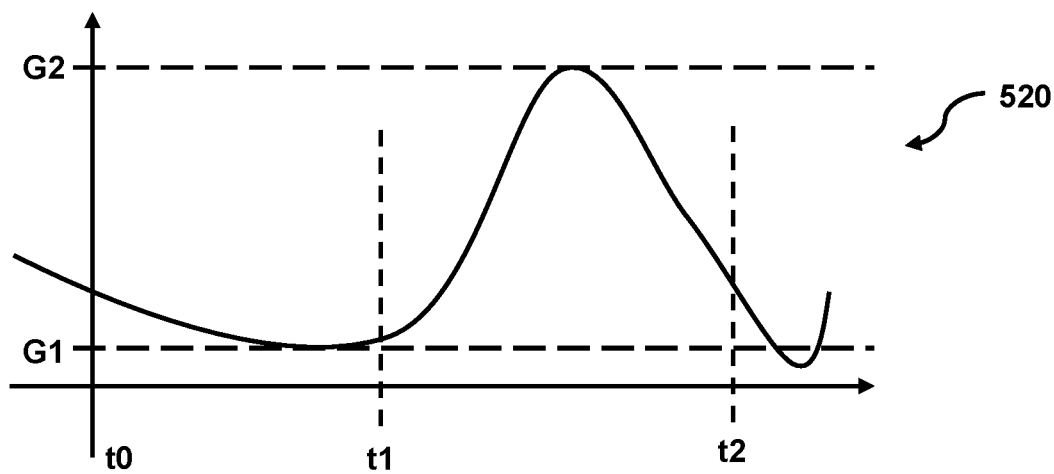

As an example, and as shown in FIGS. 5A-5C, waveform 500 may represent an audio signal of an example instance of dry stem 304. Waveform 500 various in gain (along the Y-axis) over time (along the X-axis). In some embodiments, audio signals 302 may be encoded using a time code to indicate a value of the gain of each audio signal over time. For example, the time may be a temporal duration of sounds (e.g., music, audio of a video, etc.) produced when audio signals 302 are output by a playback device (e.g., audio sources 110, client devices 108). In some embodiments, the time codes may indicate discrete time windows of each audio signal of audio signals 302. For example, one time code, t0, may indicate when one discrete time window begins, and another time code, t1, may indicate when that discrete time window ends and a subsequent time window begins. Each audio signal of audio signals 302 may be configured to store a gain level of the sounds during that discrete time window. Dry stem 304 may therefore also include time codes indicating various time windows of the sounds and gain levels of the sounds, with the exception that the audio signals that form dry stem 304 do not include any effects (e.g., delays, reverb, echo, etc.).

In some embodiments, dry stem encoding subsystem 166 may use the metadata included in audio map 308 to adjust a gain of audio signals included in dry stem 304 for different time windows, indicate a position (e.g., virtual locations P1-P4) of each of the plurality of audio objects during a given time window, or enrich dry stem 304 in other manners. For example, with reference to FIG. 5B, audio map 308 may include metadata 510 indicating that during a time window beginning at time t0 and ending at time t1, the gain of the audio is to be adjusted to a gain level G1 and during a subsequent time window beginning at time t1 and ending at time t2, the gain of the audio is to be adjusted to a gain level G2. As seen in FIG. 5C, waveform 520 represents waveform 500 after adjustments to the gain have been made to a corresponding audio signal. For example, during the time window beginning at time t0 and ending at time t1, the gain of the audio signal represented by waveform 520 has been adjusted to be at a gain level G1, while during the time window beginning at time t1 and ending at time t2, the gain of the audio signal represented by waveform 520 has been adjusted to be at a gain level G2.

Figure 6:
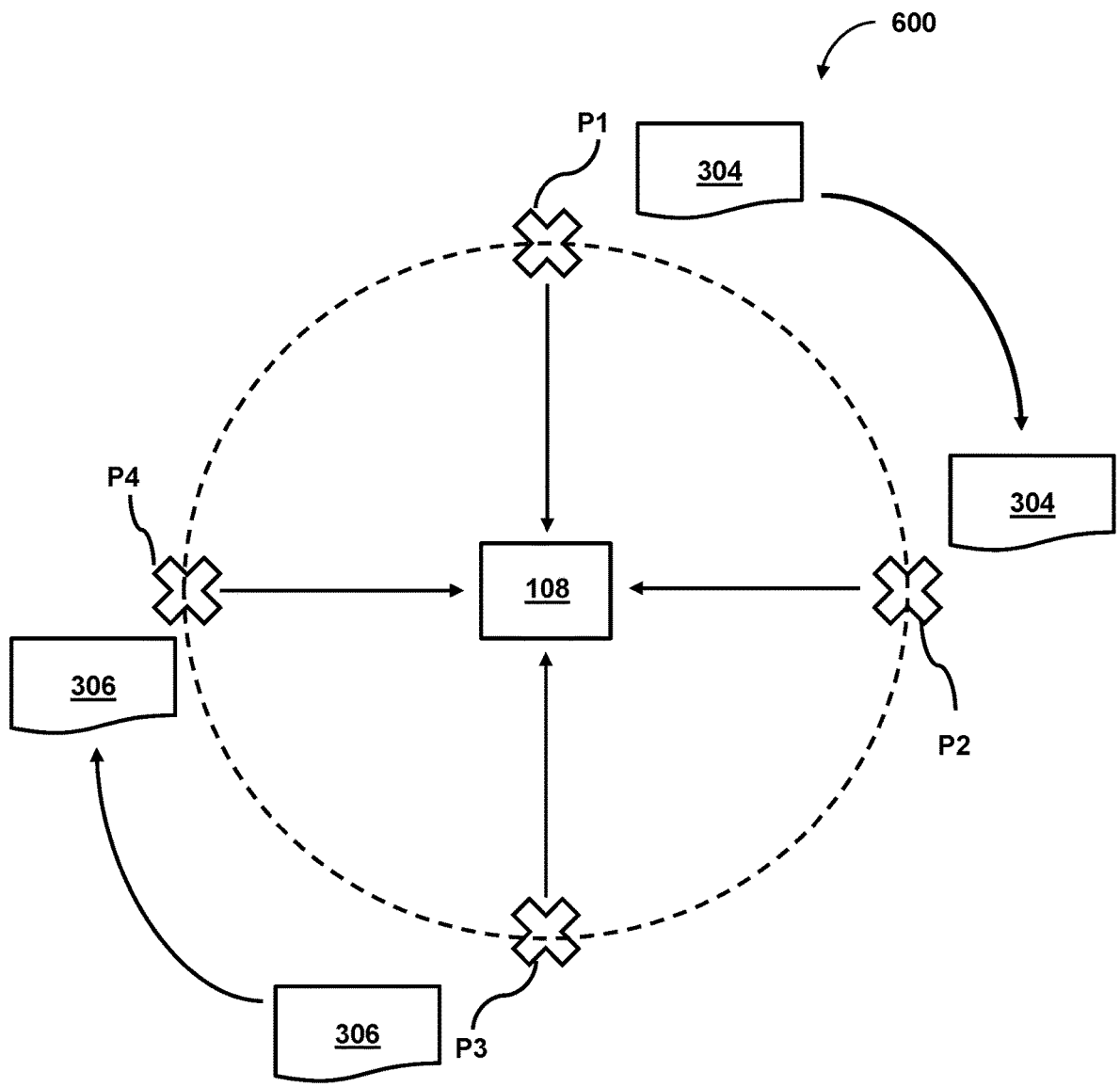
FIG. 6 shows a diagram of virtual locations from where audio associated with a dry stem appears to move to, in accordance with one or more embodiments.

Dry stem encoding subsystem 166 may further adjust a position (e.g., virtual locations P1-P4) of each of the plurality of audio objects during a given time window. As an example, with reference to FIG. 5B and FIG. 6, during a first time window, audio map 308 may include instructions indicating that, beginning at time t0 and ending at time t1, the audio signal of one or more dry stem (e.g., dry stem 304) is to be associated with virtual location P1, and that, beginning at time t1 and ending at time t2, the audio signal of the one or more dry stems (e.g., dry stem 304) is to be associated with virtual location P2. As seen in 3D space 600 of FIG. 6, by associating the audio signal (e.g., dry stem 304) with different audio objects, located at different virtual locations, at different times may cause the sounds to appear as though they are moving. For instance, by associating dry stem 304 with virtual location P1 during a first time period and then virtual location P2 during a second, subsequent, time period, the sounds produced by dry stem 304, or more particularly, encoded dry stem 310 (which includes the metadata from audio map 308) appears to be originating from one position (e.g., virtual location P1) and then moving from that position to another position (e.g., virtual location P2) as time progresses. Imparting the sense of movement to audio is expected to enrich the sonic experience of an individual by having that individual feel as though they are immersed in the sounds, without requiring specialized hardware or software components to be used.

Wet stem encoding subsystem 168 may be configured to encode wet stem 306 to obtain an encoded wet stem. For example, with reference again to FIG. 3, wet stem encoding subsystem 168 may generate encoded wet stem 312 based on wet stem 306 and audio map 308. In some embodiments, encoded wet stem 312 represents wet stem 306 including one or more modifications. Encoding wet stem 306 may include wet stem encoding subsystem 168 adding metadata included in audio map 308 to wet stem 306. The metadata may include an association of each component of wet stem 306 with each of a plurality of audio objects. For example, as mentioned above with reference to FIG. 4, 3D space 400 includes a plurality of audio objects (e.g., the "X"s located at a virtual locations P1-P4 in 3D space 400). In some embodiments, encoding wet stem 306 may also include associating wet stem 306 with a gain level for each of the plurality of audio objects. For example, the metadata may indicate a position (e.g., virtual locations P1-P4) of each of the plurality of audio objects at a given time, one or more adjustments to a gain (e.g., a gain level) associated with each of the plurality of audio objects, information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position (e.g., movement) of the audio object with 3D space 400, biases to be applied to a gain or position (e.g., virtual location) of an audio object, and/or speaker zone constraint (including data for disabling selected speaker, e.g., virtual speakers in a 3D space), or other information. In addition to or as alternative to adjusting the gain level, encoding wet stem 306 may include adding an aggregate gain based on one or more desired audio object positions within 3D space 400, a distance from the desired audio object position to a reference position (e.g., a virtual location of client device 108 within 3D space 400), a velocity of an audio object or an audio object content type, or other criteria, or a combination thereof. Still further, encoding wet stem 306 may further include adding instructions to wet stem 306 to control audio object spread in one or more of three-dimensions, and/or adding data for mapping audio object locations (e.g., virtual locations P1-P4) to planes of speaker arrays (e.g., virtual speakers in 3D space 400) of a reproduction environment.

Figure 7A:
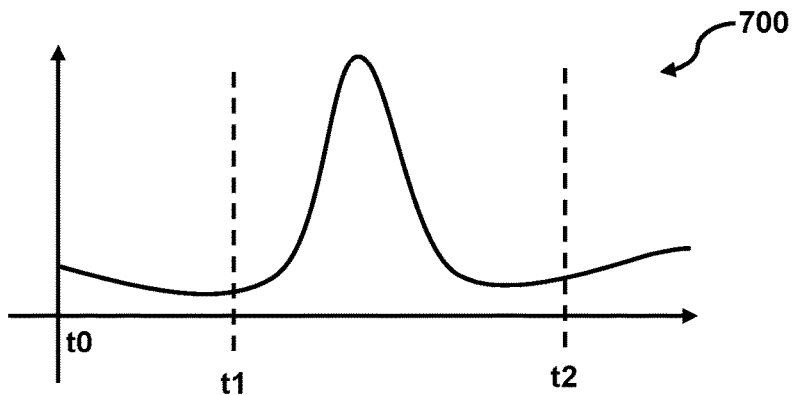
FIGS. 7A-7C show diagrams of automation being applied to a wet stem, in accordance with one or more embodiments.
Figure 7B:
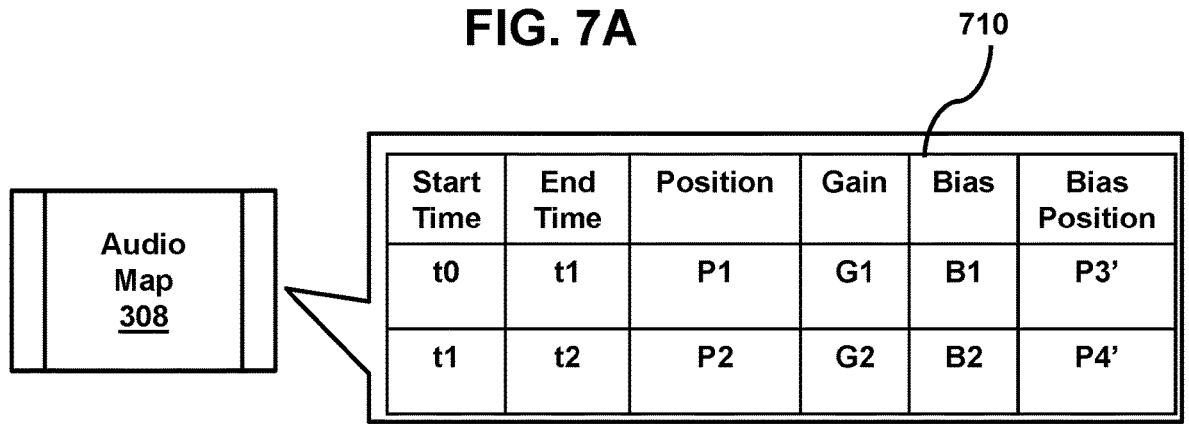
Figure 7C:
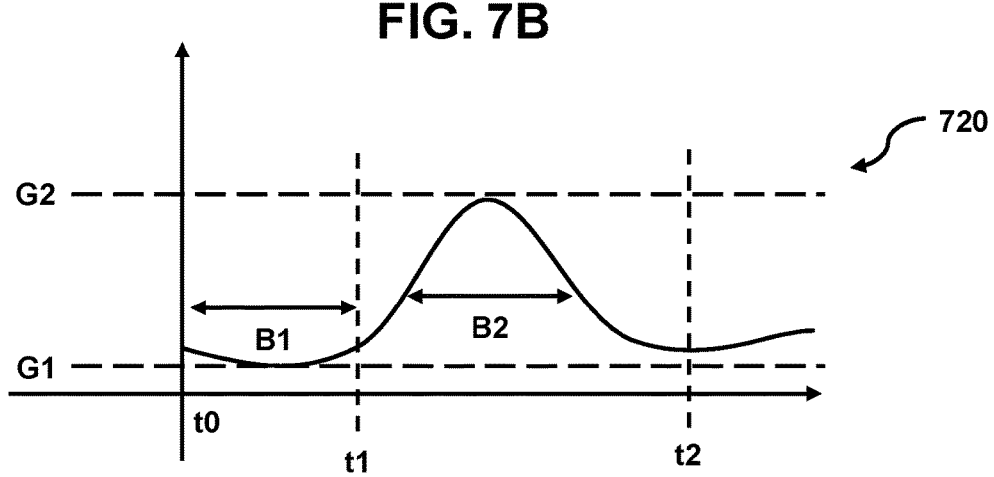

As an example, as shown in FIGS. 7A-7C, waveform 700 may represent an audio signal of an example instance of wet stem 306. Waveform 700 varies in gain (along the Y-axis) over time (along the X-axis). In some embodiments, audio signals 302 may be encoded using a time code to indicate a value of the gain of each audio signal over time. For example, the time may be a temporal duration of sounds (e.g., music, audio of a video, etc.) produced when audio signals 302 are output by a playback device (e.g., audio sources 110, client devices 108). In some embodiments, the time codes may indicate discrete time windows of each audio signal of audio signals 302. For example, one time code, t0, may indicate when one discrete time window begins, and another time code, t1, may indicate when that discrete time window ends and a subsequent time window begins. Each audio signal of audio signals 302 may be configured to store a gain level of the sounds during that discrete time window. Wet stem 306 may therefore also include time codes indicating various time windows of the sounds and gain levels of the sounds, with the exception that the audio signals that form wet stem 306 include effects (e.g., delays, reverb, echo, etc.).

In some embodiments, wet stem encoding subsystem 168 may use the metadata included in audio map 308 to adjust a gain of audio signals included in wet stem 306 for different time windows, indicate a position (e.g., virtual locations P1-P4) of each of the plurality of audio objects during a given time window, adjust a bias of the gain or audio object position, or enrich wet stem 306 in other manners. For example, with reference to FIG. 7B, audio map 308 may include metadata 710 indicating that during a time window beginning at time t0 and ending at time t1, the gain of the audio is to be adjusted to a gain level G1 and during a subsequent time window beginning at time t1 and ending at time t2, the gain of the audio is to be adjusted to a gain level G2. As seen in FIG. 5C, waveform 720 represents waveform 500 after adjustments to the gain have been made to a corresponding audio signal. For example, during the time window beginning at time t0 and ending at time t1, the gain of the audio signal represented by waveform 720 has been adjusted to be at a gain level G1, while during the time window beginning at time t1 and ending at time t2, the gain of the audio signal represented by waveform 720 has been adjusted to be at a gain level G2.

Figure 8:
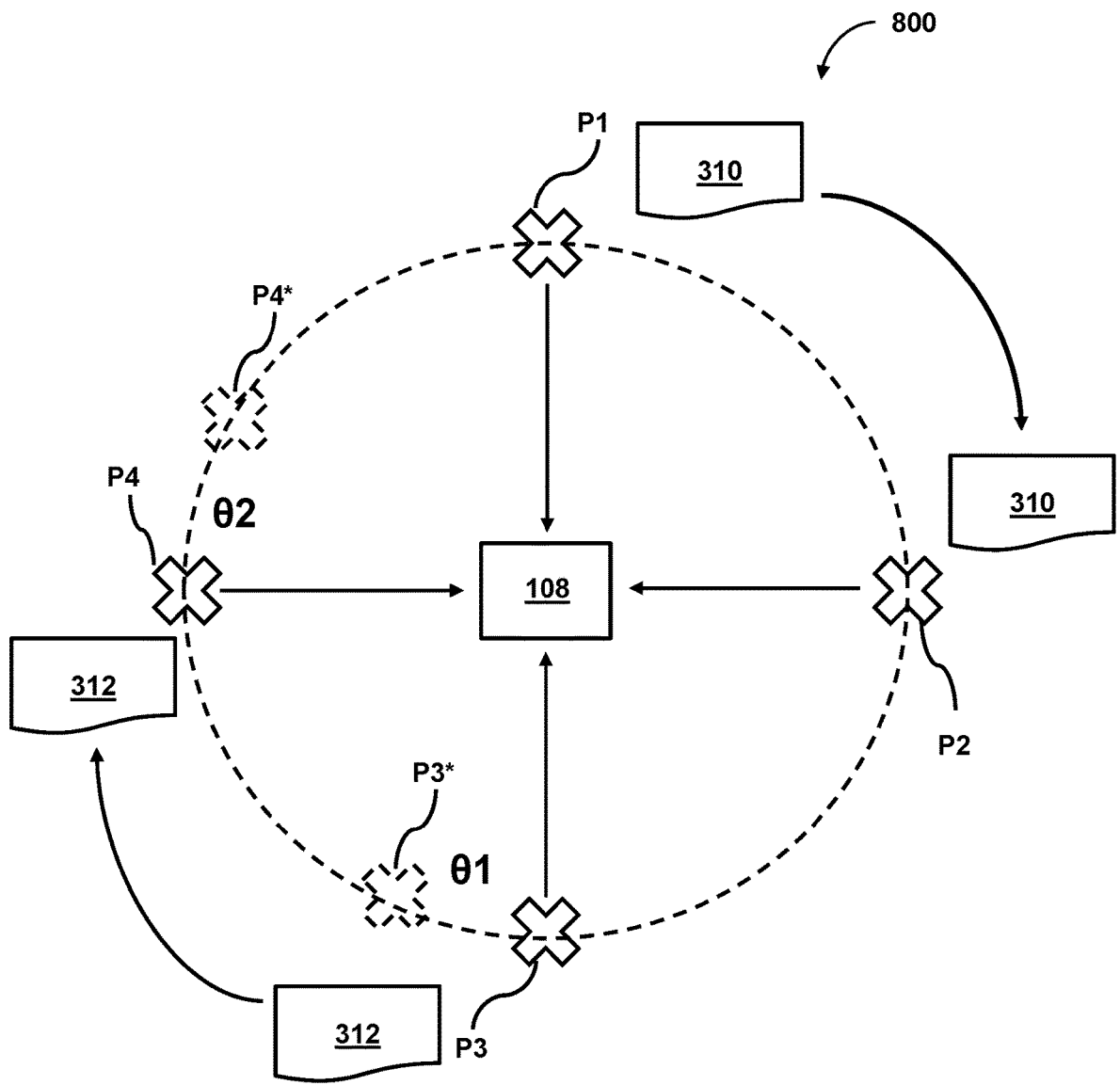
FIG. 8 shows a diagram of virtual locations from where audio associated with a wet stem appears to move to and an phantom signal effect applied to the wet stem, in accordance with one or more embodiments.

Wet stem encoding subsystem 168 may further adjust a position (e.g., virtual locations P1-P4) of some or all of the plurality of audio objects during a given time window. As an example, with reference to FIG. 7B and FIG. 8, during a first time window, audio map 308 may include instructions indicating that, beginning at time t0 and ending at time t1, the audio signal of one or more wet stems (e.g., wet stem 306) is to be associated with virtual location P1, and that, beginning at time t1 and ending at time t2, the audio signal of the one or more wet stems (e.g., wet stem 306) is to be associated with virtual location P2. As seen in 3D space 800 of FIG. 8, by associating the audio signal (e.g., wet stem 306) with different audio objects, located at different virtual locations, at different times may cause the sounds to appear as though they are moving. For instance, by associating wet stem 306 with virtual location P1 during a first time period and then virtual location P2 during a second, subsequent, time period, the sounds produced by wet stem 306, or more particularly, encoded wet stem 312 (which includes the metadata from audio map 308) appears to be originating from one position (e.g., virtual location P1) and then moving from that position to another position (e.g., virtual location P2) as time progresses. Imparting the sense of movement to audio is expected to enrich the sonic experience of an individual by having that individual feel as though they are immersed in the sounds, without requiring specialized hardware or software components to be used.

Alternatively or additionally, wet stem encoding subsystem 168 may be configured to encode wet stem 306 to be associated with a virtual location opposite a virtual location of dry stem 304 at a corresponding time. Doing so may create a sonic mirroring effect whereby the sounds associated with wet stem 306, and particularly encoded wet stem 312, to sound as though they have reflected off of a surface located opposite a location of an audio object from where wet stem 306, and particularly encoded dry stem 310, originates. For example, if, during a first time period (e.g., a time period beginning at time t0 and ending at time t1), encoded dry stem 310 is associated with virtual location P1, then during the same first time period, encoded wet stem 312 may be associated with virtual location P3 (located 180-degrees from virtual location P1). Similarly, if, during a second time period (e.g., a time period beginning at time t1 and ending at time t2), encoded dry stem 310 is associated with virtual location P2, then during the same first time period, encoded wet stem 312 may be associated with virtual location P4 (located 180-degrees from virtual location P2). Therefore, in some embodiments, while sounds associated with encoded dry stem 310 may appear to move from virtual location P1 to virtual location P2, sounds associated with encoded wet stem 312 may appear to move from virtual location P3 to virtual location P4.

In some embodiments, wet stem 306 may be a stereo signal and may include a right channel and a left channel. As wet stem 306 includes an audio signal with effects (e.g., reverb, delay, echo), each channel (right and left) includes different information. Therefore, the right and left channels, in some cases, cannot be collapsed into a single channel (e.g., a mono channel) because of possible phasing and artifacts. Thus, wet stem encoding subsystem 168 may be configured to separate the right and left components of wet stem 306 when performing the encoding so as to perform the association of each audio component with a corresponding virtual location and gain level separately.

In some embodiments, wet stem encoding subsystem 168 may further be configured to apply a bias to each component of wet stem 306 during the encoding process. The bias may apply an additional shift to the left channel, right channel, or both left and right channels, of encoded wet stem 312. For example, with reference again to FIG. 8, virtual location P3 may be shifted by an angle θ1 to shifted virtual location P3*, and virtual location P4 may be shifted by an angle θ2 to shifted virtual location P4*. While virtual locations P3 and P4 are located 180-degrees opposite that of virtual locations P1 and P2, respectively, shifted virtual locations P3* and P4* are shifted by 180-degrees+/−θ1 and 180-degrees+/θ2 with respect to virtual locations P1 and P2, respectively. Therefore, in some embodiments, instead of the sounds associated with encoded wet stem 312 appearing to move, sonically, from virtual location P3 to virtual location P4, the sounds associated with encoded wet stem 312 may appear to move, sonically, from shifted virtual location P3* to shifted virtual location P4*, while, contemporaneously, sounds associated with encoded dry stem 310 may appear to move, sonically, from virtual location P1 to virtual location P2.

In some embodiments, computer system 160 may be configured to identify interference produced by shifting virtual locations. For example, if a shifted virtual location causes a vector component of the output sounds of one channel (e.g., right/left channel) to interfere with a vector component of the output sounds of another channel (e.g., left/right channel), then some or all of the interfering vector components may be reduced to improve the sonic quality of the overall output audio. This may also serve to improve storage capabilities of the output audio data, formed by combining encoded dry stem 310 and encoded wet stem 312 (detailed below) as less audio data is needed to be stored.

In some embodiments, computer system 160 may be configured to cause shifts in the positions of the audio objects (e.g., virtual locations P1-P4) along an axis orthogonal to the X-Y plane. For example, a shift in the audio objects may be implemented to cause the audio to appear as though it originates from a location above or below the X-Y plane.

D audio generation subsystem 170 may be configured to generate 3D audio data including encoded dry stem 310 and encoded wet stem 312. In some embodiments, 3D audio generation subsystem 170 obtains encoded dry stem 310 and encoded wet stem 312 and, based on encoded dry stem 310 and encoded wet stem 312, generates 3D audio data 314. In some embodiments, 3D audio data 314 is 3D audio data. 3D audio data represents audio (e.g., one or more sounds) that gives an individual listening to those sounds the effect of the sound moving in time based on one or more audio objects. Furthermore, 3D audio data 314, when output by one or more audio playback devices, such as client devices 108, can create an audio object spread in one or more of three-dimensions, and can also map audio object locations to planes of speaker arrays (e.g., virtual speakers in 3D space) of a reproduction environment.

D audio data 314, in some cases, can enable an individual to listen to spatialized audio (e.g., 3D audio) including effects (e.g., reverb, delay, echo) without the need for specialized equipment, such as special hardware or software. Therefore, a technical benefit of some embodiments is the ability to improve an audio files data quality without requiring a user to purchase expensive equipment or software.

Figure 9:
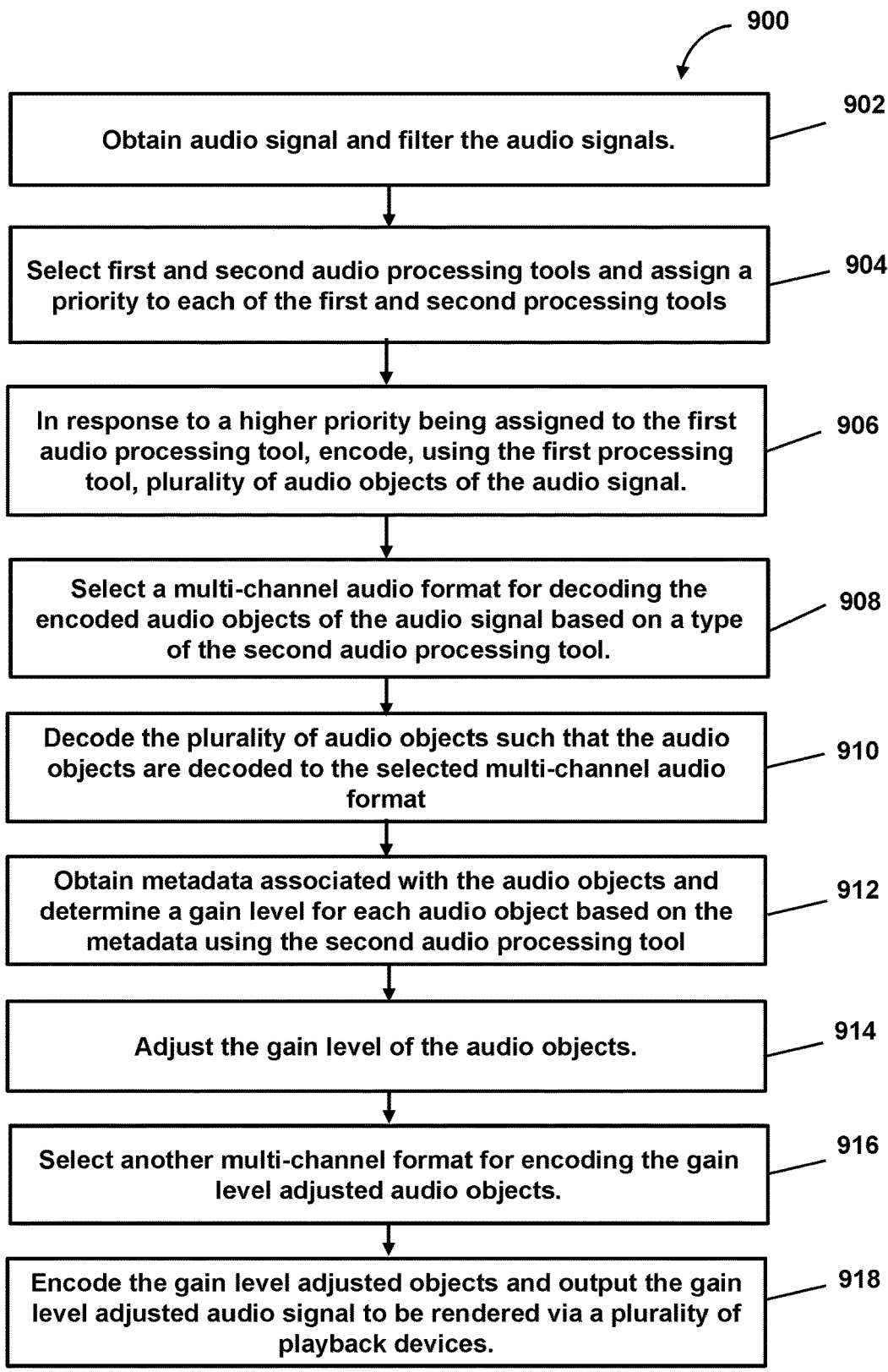
FIG. 9 shows an example flowchart for multi-stage processing of audio signals to facilitate rendering of three-dimensional (3D) audio via a plurality of playback devices, in accordance with one or more embodiments.
Figure 10:
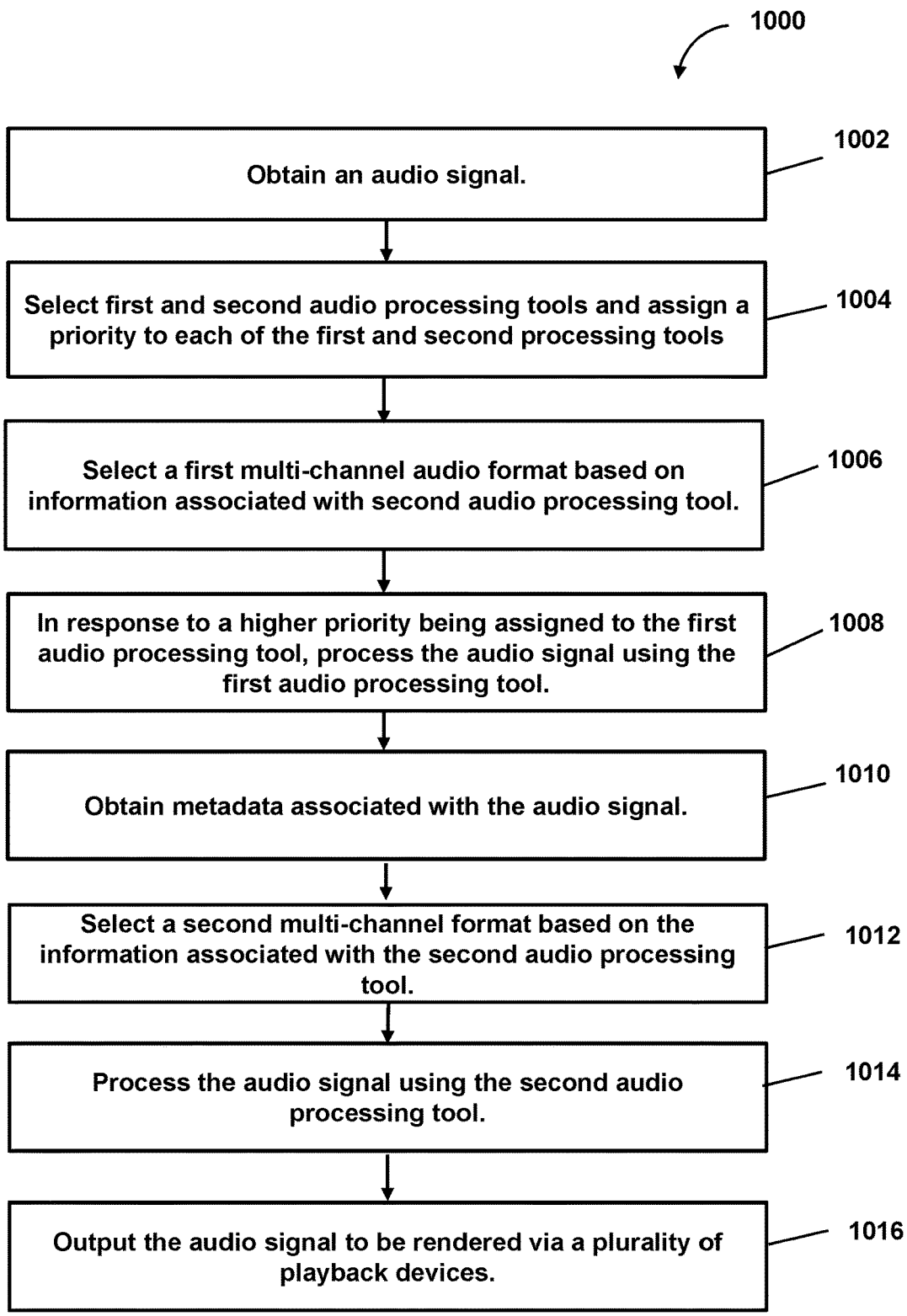
FIG. 10 shows an example flowchart for multi-stage processing of audio signals to facilitate rendering of three-dimensional (3D) audio via a plurality of playback devices, in accordance with one or more embodiments.

FIGS. 9 and 10 are example flowcharts of processing operations of methods that are an example of how the various features and functionality of the system above may be implemented. The processing operations of each method presented below are intended to be illustrative and non-limiting, which is not to suggest that any other description herein is limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, a digital signal processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 9 shows a method 900 that may be performed by different components of the computer system for facilitating the rendering of a 3D audio via a plurality of playback devices. In step 902, a plurality of audio signals may be obtained. The audio signals may correspond to a single channel format (e.g., mono) and/or multi-channel format (e.g., stereo, binaural, surround, ambisonics, etc.). Further, in step 902, the plurality of audio signals may be filtered such that one or more of the audio signals are approved for further processing and other audio signals are not rejected. In step 904, a first audio processing tool and a second audio processing tool may be selected. For example, the audio signal (which has been filtered and approved for further processing) may be analyzed in order to determine a first audio processing tool and a second audio processing tool may be selected based on the selection of the first audio processing tool. Further, in step 904, a priority may be assigned to (or associated with) a plurality of audio processing tools. Such priority determines an order in which an audio signal is to be processed. The priority may be assigned to the selected audio processing tools, for example, based on a type (e.g., audio format) of the audio signal obtained from an audio source and/or based on content or information included in (or missing from) the audio signal.

In step 906, in response to a selection of a first audio processing tool and in response to a determination that the first audio processing tool may be associated with a higher priority than a second audio processing tool, the audio signal is first processed using the first audio processing tool. Specifically, in some embodiments, in response to a determination that the first audio processing tool is associated with a higher priority than a second audio processing tool, a plurality of audio objects of the audio signal are encoded using the first audio processing tool. In step 908, a multi-channel audio format is selected for decoding the encoded plurality of objects of the audio signal. Such a selection may be based on the selected second audio processing tool. In other words, a multi-channel format that is compatible with the selected second audio processing tool may be selected such that the second processing tool may process the audio signal in a format compatible with the second audio processing tool. In step 910, the plurality of objects of the audio signal may be decoded, such that the plurality of audio objects of the audio signal are converted (or decoded) to the selected multi-channel audio format.

In step 912, metadata associated with the audio signal (e.g., metadata associated with each of the plurality of audio objects) may be obtained and a gain level for each of the plurality of objects of the audio signal may be determined based on the metadata using the second audio processing tool. The metadata may indicate a position of each of the plurality of audio objects of the audio signal in a 3D space at a given time. In step 914, the gain level of the plurality of objects of the audio signal may be adjusted using the second audio processing tool.

In step 916, another multi-channel audio format may be selected for encoding the gain level adjusted audio objects. The multi-channel format may be selected based on the selected second audio processing tool, the above-discussed selected multi-channel format for decoding the encoded audio signal, a type of audio signal, and/or information or content included in (or missing from) the audio signal. In step 918, the gain level adjusted audio signal (e.g., gain level adjusted audio objects) may be encoded such that the gain level adjusted audio signal is converted to the selected multi-channel format using the second audio processing tool. Further, in step 918, the encoded audio signal (e.g., the encoded gain level adjusted audio signal) may be output so that the encoded audio signal is playable via a plurality of playback devices.

FIG. 10 shows a method 1000 that may be performed by different components of the computer system for facilitating the rendering of a 3D audio via a plurality of playback devices. In step 1002, an audio signal may be obtained. The audio signal may correspond to a multi-channel format (e.g., stereo, binaural, surround, ambisonics, etc.). In step 1004, a first audio processing tool and a second audio processing tool may be selected. For example, the audio signal may be analyzed in order to determine a first audio processing tool and a second audio processing tool may be selected based on the selection of the first audio processing tool. Further, in step 1004, a priority may be assigned to (or associated with) a plurality of audio processing tools. Such priority determines an order in which an audio signal is to be processed. The priority may be assigned to the selected audio processing tools, for example, based on a type (e.g., audio format) of the audio signal and/or based on content or information included in (or missing from) the audio signal.

In step 1006, a first multi-channel audio format may be selected. Such selection may be based on information associated with the second audio processing tool. In other words, a multi-channel format that is compatible with the selected second audio processing tool may be selected such that the second processing tool may process the audio signal in a format compatible with the second audio processing tool. In step 1008, in response to a higher priority being assigned to the first audio processing tool, the audio signal may be processed using the first audio processing tool during a first stage audio process. The processing of the audio signal using the first audio processing tool may include converting the audio signal to the selected first multi-channel audio format.

In step 1010, metadata associated with the audio signal (e.g., metadata associated with each of the plurality of audio objects) may be obtained. The metadata may indicate a position of each of the plurality of audio objects of the audio signal in a 3D space at a given time. In step 1012, a second multi-channel audio format may be selected. Such selection may be based on the information associated with the second audio processing tool. In step 1014, the audio signal may be processed using the second audio processing tool during a second stage audio process. The processing of the audio signal using the second audio processing tool may include converting the audio signal to the selected second multi-channel audio format. In step 1016, the audio signal may be output in the second multi-channel audio format to be rendered via a plurality of playback devices.

Some embodiments consistent with the above-noted steps are expected to have several advantages, though again, embodiments are not limited to systems affording all of these advantages. First, in some embodiments, the above-noted steps of performing multi-stage audio processing (including the selection of multi-channel audio formats, assigning and/or determining priority associated with audio processing tools and/or multi-channel audio formats) facilitates the rendering of 3D sound via a plurality of playback devices regardless of the hardware and/or software configuration of the playback devices. As noted above, in some other systems, hardware and/or software configuration of a playback device is necessary in order to enable playback of 3D sounds. However, the above-noted multi-stage audio processing of the present disclosure in some embodiments facilitates the rendering of 3D sound via a plurality of playback devices regardless of the hardware and/or software configuration of the playback devices. Second, despite being able to play the audio signal (e.g., the 3D sound) via a plurality of playback devices, the quality of the audio is expected to be not diminished. Indeed, performing the above-noted multi-stage audio processing is expected to enhance the quality of the sound played back via a plurality of different playback devices.

Figure 11:
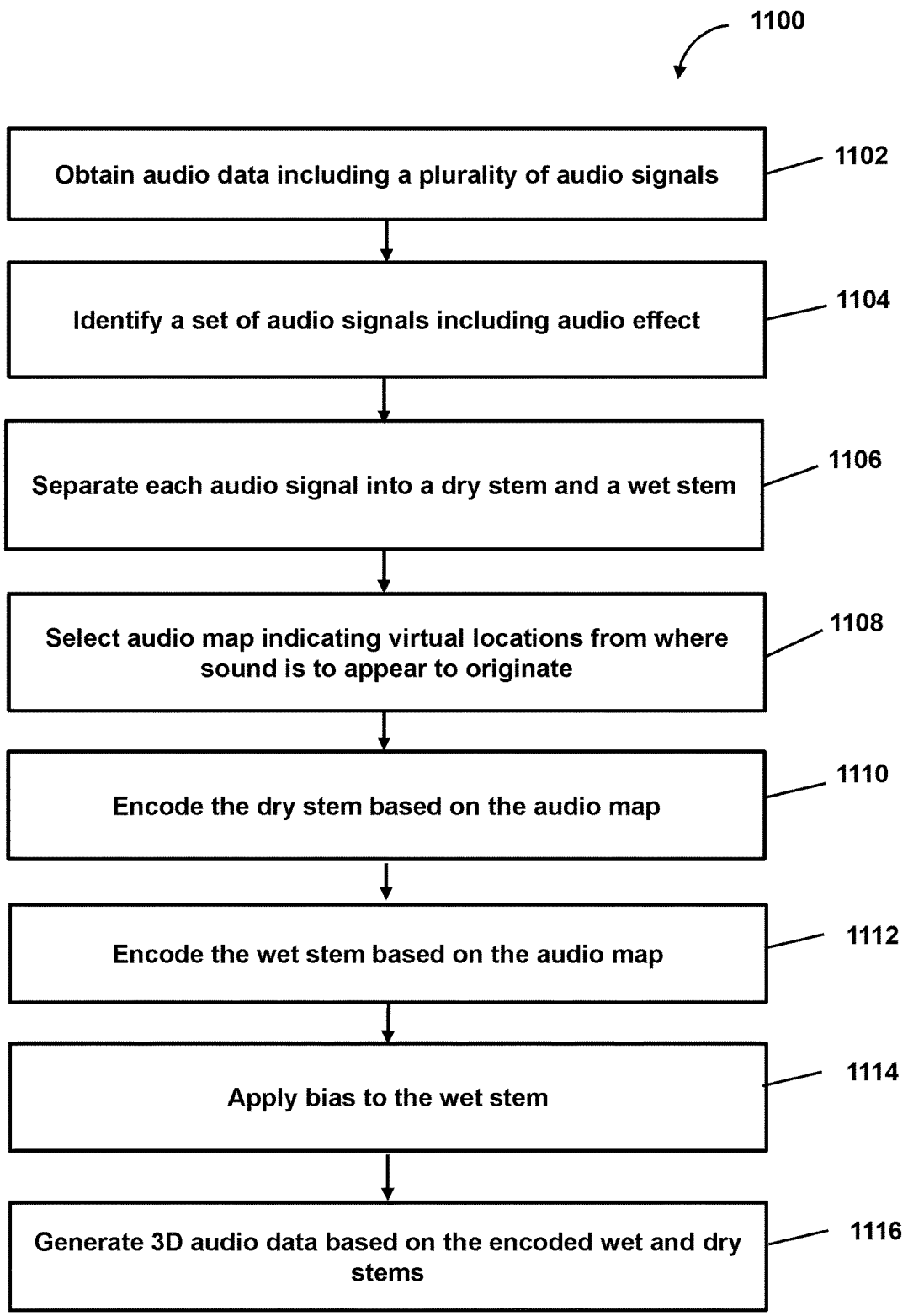
FIG. 11 shows an example flowchart for generating three-dimensional (3D) audio data, in accordance with one or more embodiments.

FIG. 11 shows an example flowchart of a method 1100 for generating three-dimensional (3D) audio data, in accordance with one or more embodiments. In some embodiments, method 1100 may begin at step 1002. At step 1002, audio data including a plurality of audio signals may be obtained. For example, audio signals 302 may be produced by one or more audio sources 110, and may represent various sounds. The sounds may include music, audio from a video, radio sounds, etc. In some embodiments, audio signals 302 may not be spatialized (e.g., not 3D spatialized). In some embodiments, step 1102 may be performed by a subsystem that is the same or similar to stem separation subsystem 162.

At step 1104, a set of audio signals that include one or more audio effects may be identified from the plurality of audio signals. Some or all of the audio signals may include one or more effects. For example, the audio signals forming audio signals 302 may include effects such as reverberation, echoing, delay, phaser, or other effects, or a combination thereof. In some embodiments, an audio analyzer may be configured to analyze audio signals 302 and identify whether a given audio signal includes an audio effect and the type of audio effect. For example, a machine learning model, such as ML model 202, may be trained to identify audio effects in audio signals. A classifier may be used to classify each audio signal into a group of audio signals including a particular type of audio effect. In some embodiments, step 1104 may be performed by a subsystem that is the same or similar to stem separation subsystem 162.

At step 1106, each audio signal from the set of audio signals may be separated into a dry stem (e.g., dry stem 304) and a wet stem (e.g., wet stem 306). The dry stem may be an audio signal that does not include any effects, and the wet stem for the same audio signal may include effects. Each of dry stem 304 and wet stem 306 may be processed separately using different audio processing tools. Additionally, some embodiments include dry stem 304, wet stem 306, or both dry stem 304 and wet stem 306 being monolithic, stereo, or of a different audio format. In some embodiments, step 1106 may be performed by a subsystem that is the same or similar to stem separation subsystem 162.

At step 1108, an audio map indicating virtual locations from where sound is to appeal to originate may be selected. Audio map 308 may be stored in memory 128 or database 132, and may retrieved therefrom in response to being selected. In some embodiments, audio map 308 is generated prior to being selected. Audio map 308 may include metadata associated with dry stem 304, wet stem 306, or both. In some cases, the metadata may include an association of each component of dry stem 304 and each component of wet stem 306 with each of a plurality of audio objects. For example, the metadata may include a position of each of the plurality of audio objects of the audio signal in a 3D space at a given time. In some embodiments, audio map 308 may be determined to include, or generated to indicate, a gain level for each of the plurality of audio objects of dry stem 304, wet stem 306, or both. Audio map 308 may include the metadata indicating a position (e.g., virtual locations P1-P4) of each of the plurality of audio objects at a given time. The metadata included by audio map 308 may indicate one or more adjustments to a gain (e.g., a gain level) associated with each of the plurality of audio objects. The metadata may further include information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position of the audio object with a 3D space (e.g., 3D space 400, 800), and/or speaker zone constraint (including data for disabling selected speaker, e.g., virtual speakers in a 3D space), or other information. In addition to or alternative to adjusting the gain level, audio map 308 may include instructions to cause computer system 160 to create an aggregate gain based on one or more desired audio object positions, a distance from the desired audio object position to a reference position (e.g., a virtual location of client device 108 within 3D space 400), a velocity of an audio object or an audio object content type, or other criteria, or a combination thereof. Audio map 308 may further include instructions to enable computer system 160 to control audio object spread in one or more of three-dimensions, and/or include data for mapping audio object locations (e.g., virtual locations P1-P4) to planes of speaker arrays (e.g., virtual speakers in 3D space 400) of a reproduction environment. In some embodiments, step 1108 may be performed by a subsystem that is the same or similar to audio mapping subsystem 164.

At step 1110, the dry stem may be encoded based on the audio map. For example, dry stem 304 may be encoded based on audio map 308. Encoding dry stem 304 may include adding metadata included in audio map 308 to dry stem 304. The metadata may include an association of each component of dry stem 304 with each of a plurality of audio objects. For example, as mentioned above with reference to FIG. 4, 3D space 400 includes a plurality of audio objects (e.g., the "X"s located at a virtual locations P1-P4 in 3D space 400). In some embodiments, encoding dry stem 304 may also include associating dry stem 304 with a gain level for each of the plurality of audio objects. For example, the metadata may indicate a position (e.g., virtual locations P1-P4) of each of the plurality of audio objects at a given time, one or more adjustments to a gain (e.g., a gain level) associated with each of the plurality of audio objects, information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position of the audio object with 3D space 400, and/or speaker zone constraint (including data for disabling selected speaker, e.g., virtual speakers in a 3D space), or other information. In addition to as an or alternative to adjusting the gain level, encoding dry stem 304 may include adding an aggregate gain based on one or more desired audio object positions, a distance from the desired audio object position to a reference position, a velocity of an audio object or an audio object content type, or other criteria, or a combination thereof. Still further, encoding dry stem 304 may further include adding instructions to dry stem 304 to control audio object spread in one or more of three-dimensions, and/or adding data for mapping audio object locations to planes of speaker arrays of a reproduction environment. In some embodiments, encoding dry stem 304 may include adjusting a position (e.g., virtual locations P1-P4) of each of the plurality of audio objects during a given time window. In some embodiments, step 1110 may be performed by a subsystem that is the same or similar to dry stem encoding subsystem 166.

At step 1112, the wet stem may be encoded based on the audio map. For example, wet stem 306 may be encoded based on audio map 308. Encoding wet stem 306 may include adding metadata included in audio map 308 to wet stem 306. The metadata may include an association of each component of wet stem 306 with each of a plurality of audio objects. In some embodiments, encoding wet stem 306 may also include associating wet stem 306 with a gain level for each of the plurality of audio objects. For example, the metadata may indicate a position (e.g., virtual locations P1-P4) of each of the plurality of audio objects at a given time, one or more adjustments to a gain (e.g., a gain level) associated with each of the plurality of audio objects, information for mapping an audio object's position (e.g., one of virtual locations P1-P4) to a reproduction environment where one or more humans are capable of listing to sounds via client device(s) 108 (e.g., an audio playback device), data for constraining a position (e.g., virtual locations P1-P4) of an audio object to a one-dimensional curve or a two-dimensional surface, trajectory data for an audio object indicating a time-variable position (e.g., movement) of the audio object with a 3D space (e.g., 3D space 400, 3D space 800), biases to be applied to a gain or position (e.g., virtual location) of an audio object, and/or speaker zone constraint (including data for disabling selected speaker, e.g., virtual speakers in a 3D space), or other information. In addition to or alternative to adjusting the gain level, encoding wet stem 306 may include adding an aggregate gain based on one or more desired audio object positions, a distance from the desired audio object position to a reference position (e.g., a virtual location of client device 108 within 3D space 400), a velocity of an audio object or an audio object content type, or other criteria, or a combination thereof. Still further, encoding wet stem 306 may further include adding instructions to wet stem 306 to control audio object spread in one or more of three-dimensions, and/or adding data for mapping audio object locations (e.g., virtual locations P1-P4) to planes of speaker arrays of a reproduction environment. In some embodiments, encoding wet stem 306 may include adjusting a gain of audio signals included in wet stem 306 for different time windows, indicate a position (e.g., virtual locations P1-P4) of each of the plurality of audio objects during a given time window, adjust a bias of the gain or audio object position, or enrich wet stem 306 in other manners and/or adjusting a position (e.g., virtual locations P1-P4) of some or all of the plurality of audio objects during a given time window. In some embodiments, encoding wet stem 306 may include associating a virtual location of wet stem 306 with a virtual location opposite that of dry stem 304 at a corresponding time. In some embodiments, step 1112 may be performed by a subsystem that is the same or similar to wet stem encoding subsystem 168.

At step 1114, bias may be applying to the wet stem. For example, bias may be added to some or all of wet stem 306. In some embodiments, wet stem 306 may be a stereo signal including a right channel and a left channel, and the encoding may include associating each audio component with a corresponding virtual location and gain level separately. In some embodiments, encoding wet stem 306 may include applying a bias to each component of wet stem 306 (e.g., applying an additional shift to the left channel, right channel, or both left and right channels). For example, virtual location P3 may be shifted by an angle θ1 to shifted virtual location P3* and virtual location P4 may be shifted by an angle θ2 to shifted virtual location P4*. While virtual locations P3 and P4 are located 180-degrees opposite that of virtual locations P1 and P2, respectively, shifted virtual locations P3* and P4* are shifted by 180-degrees+/−θ1 and 180-degrees+/θ2 with respect to virtual locations P1 and P2, respectively. Therefore, in some embodiments, instead of the sounds associated with encoded wet stem 312 appearing to move, sonically, from virtual location P3 to virtual location P4, the sounds associated with encoded wet stem 312 may appear to move, sonically, from shifted virtual location P3* to shifted virtual location P4*, while, contemporaneously, sounds associated with encoded dry stem 310 may appear to move, sonically, from virtual location P1 to virtual location P2. In some embodiments, step 1114 may be performed by a subsystem that is the same or similar to wet stem encoding subsystem 168.

At step 1116, 3D audio data may be generated based on the encoded wet and dry stems. For example, 3D audio data 314 may be generated based on encoded dry stem 310 and encoded wet stem 312. In some embodiments, 3D audio data 314 represents audio (e.g., one or more sounds) that gives an individual listening to those sounds the effect of the sound moving in time based on one or more audio objects. When output by one or more audio playback devices, such as client devices 108, 3D audio data 314 can create an audio object spread in one or more of three-dimensions, and can also map audio object locations to planes of speaker arrays (e.g., virtual speakers in 3D space) of a reproduction environment. 3D audio data 314, in some implementations, can enable an individual to listen to spatialized audio (e.g., 3D audio) including effects (e.g., reverb, delay, echo) without the need for specialized equipment, such as special hardware or software. In some embodiments, step 1116 may be performed by a subsystem that is the same or similar to 3D audio generation subsystem 170.

In some embodiments, the various computers and subsystems illustrated in FIGS. 1A and 1B may include one or more computing devices that are programmed to perform the functions described herein. The computing devices may include one or more electronic storages (e.g., memory 128, database(s) 132, or other electronic storages), one or more physical processors programmed with one or more computer program instructions, circuitry, and/or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-126, subsystems 162-170, or both subsystems 112-126 and subsystems 162-170. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-126 and 162-170 described herein is for illustrative purposes, and is not intended to be limiting, as any of subsystems 112-126 and 162-170 may provide more or less functionality than is described. For example, one or more of subsystems 112-126 and 162-170 may be eliminated, and some or all of its functionality may be provided by other ones of subsystems 112-126 and 162-170. As another example, additional subsystems may be programmed to perform some or all of the functionality attributed herein to one of subsystems 112-126 and 162-170.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method for facilitating multi-stage processing of audio signals to facilitate rendering of three-dimensional (3D) audio via a plurality of playback devices, the method comprising: obtaining a plurality of audio signals; filtering the plurality of audio signals, such that an audio signal, from among the plurality of audio signals, corresponding to a multi-channel audio format is allowed to pass through for further processing and one or more other audio signals, from among the plurality of audio signals, corresponding to a single-channel audio format is rejected, the audio signal including a plurality of audio objects; selecting, from a plurality of audio processing tools, a first audio processing tool and a second audio processing tool; assigning a priority to each of the first audio processing tool and the second audio processing tool based on information associated with the first audio processing tool and the second audio processing tool, such that the audio signal is processed using an audio processing tool with a higher priority before being processing by another audio processing tool with a lower priority; in response to a higher priority being assigned to the first audio processing tool, encoding, during a first stage audio process and using the first audio processing tool, the plurality of audio objects of the audio signal such that the plurality of audio objects are converted to a first multi-channel audio format, the first multi-channel format representing 3D sound fields; selecting a second multi-channel audio format for decoding the encoded plurality of audio objects of the audio signal, the selection of the second multi-channel format being based on a type of the second audio processing tool, and the second multi-channel audio format being distinct from the first multi-channel audio format; decoding, during the first stage audio process and using the first audio processing tool, the plurality of audio objects of the audio signal, such that the plurality of audio objects of the audio signal are decoded to the second multi-channel audio format; obtaining metadata associated with each of the plurality of audio objects of the audio signal, the metadata indicating a position of each of the plurality of audio objects of the audio signal in a 3D space at a given time; determining, during the second stage audio process and using the second audio processing tool, a gain level for each of the plurality of audio objects of the audio signal based on the metadata indicating the position of each of the plurality of audio objects in the 3D space at the given time; adjusting, during the second stage audio process and using the second audio processing tool, the gain level of the plurality of audio objects of the audio signal; selecting a third multi-channel audio format for encoding gain level adjusted audio objects of the audio signal during the second stage audio process, the selection of the third multi-channel format being based on the type of the second audio processing tool; encoding, during the second stage audio process and using the second audio processing tool, the gain level adjusted audio objects of the audio signal, such that the gain level adjusted audio objects of the audio signal are converted to the third multi-channel audio format; and outputting the gain level adjusted audio signal to be rendered via a plurality of playback devices.

A2. The method of embodiment A1, wherein the plurality of audio signals are filtered based on a format associated with the obtained signal or information included in or excluded from the audio signal.

A3. The method of any one of embodiments A1-A2, wherein the first audio processing tool is selected based on information or content included in or missing from the obtained audio signal and the second audio processing tool is selected based on the selected first audio processing tool.

A4. The method of any one of embodiments A1-A3, wherein the first audio processing tool and the second audio processing tool are selected based on a trained prediction model.

A5. The method of any one of embodiments A1-A4, wherein a first priority is assigned to the first audio processing tool and a second priority is assigned to the second audio processing tool based on a type of the audio signal or information included in or missing from the audio signal, and wherein the first priority is higher than the second priority.

A6. A system for facilitating multi-stage processing of audio signals to facilitate rendering of three-dimensional (3D) audio via a plurality of playback devices, the system comprising: circuitry configured to perform the method of any one of embodiments A1-A5.

A7. One or more non-transitory, computer-readable media storing instructions that, when executed by one or more processors, effectuate operations comprising any one of embodiments A1-A5.

B1. A method comprising: obtaining an audio signal, the audio signal corresponding to a multi-channel audio format; selecting, from a plurality of audio processing tools, a first audio processing tool and a second audio processing tool; assigning a priority to each of the first audio processing tool and the second audio processing tool; selecting a first multi-channel audio format based on information associated with the second audio processing tool; in response to a higher priority being assigned to the first audio processing tool, processing, during a first stage audio process, the audio signal using the first audio processing tool, the processing of the audio signal using the first audio processing tool including converting the audio signal to the selected first multi-channel audio format; obtaining metadata associated with the audio signal; selecting a second multi-channel audio format based on the information associated with the second audio processing tool, the second multi-channel audio format being distinct from the first multi-channel audio format; processing, during a second stage audio process, the converted audio signal using the second audio processing tool and based on the metadata, the processing of the converted audio signal using the second audio processing tool including converting the audio signal to the selected second multi-channel audio format; and outputting the audio signal in the second multi-channel audio format to be rendered via a plurality of playback devices.

B2. The method of embodiment B1, wherein the audio signal includes a plurality of audio objects and wherein the metadata indicates a position of each of the plurality of audio objects in a three-dimensional (3D) space at a given time.

B3. The method of any one of embodiments B1-B2, further comprising: obtaining a plurality of audio signals; and filtering the plurality of audio signals, such that the audio signal, from among the plurality of audio signals, corresponding to the multi-channel audio format is allowed to pass through for further processing and one or more other audio signals, from among the plurality of audio signals, corresponding to a single-channel audio format is rejected.

B4. The method of any one of embodiments B1-B3, wherein the priority is assigned to each of the first audio processing tool and the second audio processing tool, such that the audio signal is processed using an audio processing tool with a higher priority before being processing by another audio processing tool with a lower priority.

B5. The method of any one of embodiments B1-B4, wherein processing the audio signal using the first audio processing tool includes: encoding, during the first stage audio process, a plurality of audio objects of the audio signal such that the plurality of audio objects are converted to a third multi-channel audio format, the third multi-channel format representing 3D sound fields; and decoding, during the first stage audio process, the plurality of audio objects of the audio signal, such that the plurality of audio objects of the audio signal are decoded to the first multi-channel audio format.

B6. The method of any one of embodiments B1-B5, wherein processing the audio signal using the second audio processing tool includes: determining, during the second stage audio process, a gain level for each of a plurality of audio objects of the audio signal based on the metadata indicating a position of each of the plurality of audio objects in a 3D space at a given time; adjusting, during the second stage audio process, the gain level of the plurality of audio objects of the audio signal; and encoding, during the second stage audio process, the gain level adjusted audio objects of the audio signal, such that the gain level adjusted audio objects of the audio signal are converted to the second multi-channel audio format.

B7. The method of any one of embodiments B1-B6, wherein the plurality of audio signals are filtered based on a format associated with the obtained signal or information included in or excluded from the audio signal.

B8. The method of any one of embodiments B1-B7, wherein the first audio processing tool is selected based on information or content included in or missing from the obtained audio signal and the second audio processing tool is selected based on the selected first audio processing tool.

B9. The method of any one of embodiments B1-B8, wherein the first audio processing tool and the second audio processing tool are selected based on a trained prediction model.

B10. The method of any one of embodiments B1-B9, wherein a first priority is assigned to the first audio processing tool and a second priority is assigned to the second audio processing tool based on a type of the audio signal or information included in or missing from the audio signal, and wherein the first priority is higher than the second priority.

B11. A system for facilitating multi-stage processing of audio signals to facilitate rendering of three-dimensional (3D) audio via a plurality of playback devices, the system comprising: circuitry configured to perform the method of any one of embodiments B1-B10.

B12. One or more non-transitory, computer-readable media storing instructions that, when executed by one or more processors, effectuate operations comprising any one of embodiments B1-B10.

C1. A method comprising: obtaining an audio signal; selecting a first audio processing tool and a second audio processing tool; selecting a surround sound format, the surround sound format corresponding to a 7.1.2 surround sound format; processing, during a first stage audio process, the audio signal using the first audio processing tool, the processing of the audio signal using the first audio processing tool including converting the audio signal to the selected 7.1.2 surround sound format; obtaining metadata associated with the audio signal; selecting a stereo audio format; processing, during a second stage audio process, the converted audio signal using the second audio processing tool and based on the metadata, the processing of the converted audio signal using the second audio processing tool including converting the audio signal to the selected stereo audio format; and outputting the audio signal in the stereo audio format to be rendered via a plurality of playback devices.

C2. A system for facilitating multi-stage processing of audio signals to facilitate rendering of three-dimensional (3D) audio via a plurality of playback devices, the system comprising: circuitry configured to perform the method of embodiments C1.

C3. One or more non-transitory, computer-readable media storing instructions that, when executed by one or more processors, effectuate operations comprising embodiment C1.

D1. A method, comprising: obtaining audio data comprising a plurality of audio signals; identifying, from the plurality of audio signals, a set of audio signals that include one or more audio effects; separating each audio signal of the set of audio signals into a dry stem and a wet stem, wherein the dry stem comprises an audio signal without the one or more audio effects and the wet stem comprises an audio signal with at least one of the one or more audio effects; selecting an audio map indicating virtual locations in an X-Y plane from where sound is to appear to originate; encoding each dry stem based on the audio map to generate an encoded dry stem that, when output through at least one of the one or more audio playback devices, simulates sound associated with each dry stem moving about one or more of the virtual locations; encoding each wet stem based on the audio map to generate an encoded wet stem that, when output through at least one of the one or more audio playback devices, simulates sound associated with each wet stem moving about one or more of the virtual locations opposite those of the sound associated with a respective dry stem; generating 3D audio data based on the encoded dry stem and the encoded wet stem; and providing the 3D audio data to the one or more playback devices for outputting 3D audio.

D2. The method of embodiment D1, wherein the audio map includes metadata indicating: one or more adjustments to a gain of (i) the sound associated with each dry stem and (ii) the sound associated with each wet stem; and which of the virtual locations each dry stem and each wet stem are to be associated with during a given temporal window.

D3. The method of any one of embodiments D1-D2, wherein each the one or more of the virtual locations associated with each wet stem correspond to a virtual location located at 180-degrees from a virtual location associated with a respective dry stem.

D4. The method of any one of embodiments D1-D3, wherein each wet stem comprises stereo audio comprising a right channel and a left channel, wherein encoding each wet stem comprises encoding the right channel and the left channel separately.

D5. The method of any one of embodiments D1-D4, wherein: the plurality of audio signals are synchronized with a time code; the audio data represents a piece of music; and the piece of music is segmented into a plurality of temporal windows characterized by the time code.

D6. The method of embodiment D5, wherein encoding each dry stem comprises: adjusting, for at least one temporal window of the plurality of temporal windows, based on metadata included in the audio map, a gain associated with the dry stem from a first gain level to a second gain level; and assigning, for each temporal window of the plurality of temporal windows, based on metadata included in the audio map, the dry stem to be associated with a first virtual location of the virtual locations such that, during a corresponding temporal window, the sound associated with the dry stem appears to be emitted from the first virtual location.

D7. The method of any one of embodiments D5-D6, wherein encoding each wet stem comprises: adjusting, for at least one temporal window of the plurality of temporal windows, based on metadata including the audio map, a gain associated with the wet stem from a first gain level to a second gain level; and assigning, for each temporal window of the plurality of temporal windows, based on metadata included in the audio map, the wet stem to be associated with a first virtual location of the virtual locations, wherein: the first virtual location is located opposite a second virtual location along the X-Y plane, the second virtual location being associated with a corresponding dry stem, such that, during a corresponding temporal window, the sound associated with the wet stem appears to be emitted from the first virtual location and the sound associated with the dry stem appears to be emitted from the second virtual location contemporaneously.

D8. The method of embodiment D7, wherein each wet stem includes a right channel and a left channel, encoding each wet stem further comprises: adding a first bias to the right channel to cause the first virtual location to be shifted to a position that is 180-degrees plus a first angle from the second location; and adding a second bias to the left channel to cause the first virtual location to be shifted to a position that is 180-degrees plus a second angle from the second location.

D9. The method of any one of embodiments D1-D8, wherein at least one dry stem is stereo, at least one wet stem is stereo, or at least one dry stem and at least one wet stem are stereo.

D10. The method of any one of embodiments D1-D9, wherein the one or more audio effects include at least one of: reverberation, echo, or delay.

D11. A system for facilitating multi-stage processing of audio signals to facilitate rendering of three-dimensional (3D) audio via a plurality of playback devices, the system comprising: memory storing computer program instructions; and one or more processors configured to execute the computer program instructions to effectuate operations comprising the method of any one of embodiments D1-D10.

D12. The system of embodiment D11, further comprising: one or more audio playback devices.

D13. One or more non-transitory, computer-readable media storing instructions that, when executed by one or more processors, effectuate operations comprising any one of embodiments D1-D10.

What is claimed is:

1. A method for facilitating multi-stage processing of audio signals to facilitate rendering of three-dimensional (3D) audio via a plurality of playback devices, the method comprising:
    obtaining a plurality of audio signals;
    filtering the plurality of audio signals, such that an audio signal, from among the plurality of audio signals, corresponding to a multi-channel audio format is allowed to pass through for further processing and one or more other audio signals, from among the plurality of audio signals, corresponding to a single-channel audio format is rejected, the audio signal including a plurality of audio objects;
    selecting, from a plurality of audio processing tools, a first audio processing tool and a second audio processing tool;
    assigning a priority to each of the first audio processing tool and the second audio processing tool based on information associated with the first audio processing tool and the second audio processing tool, such that the audio signal is processed using an audio processing tool with a higher priority before being processing by another audio processing tool with a lower priority;
    in response to a higher priority being assigned to the first audio processing tool, encoding, during a first stage audio process and using the first audio processing tool, the plurality of audio objects of the audio signal such that the plurality of audio objects are converted to a first multi-channel audio format, the first multi-channel audio format representing 3D sound fields;
    selecting a second multi-channel audio format for decoding the encoded plurality of audio objects of the audio signal, the second multi-channel audio format being selected based on a type of the second audio processing tool, and the second multi-channel audio format being distinct from the first multi-channel audio format;
    decoding, during the first stage audio process and using the first audio processing tool, the plurality of audio objects of the audio signal, such that the plurality of audio objects of the audio signal are decoded to the second multi-channel audio format;
    obtaining metadata associated with each of the plurality of audio objects of the audio signal, the metadata indicating a position of each of the plurality of audio objects of the audio signal in a 3D space at a given time;
    determining, during a second stage audio process and using the second audio processing tool, a gain level for each of the plurality of audio objects of the audio signal based on the metadata indicating the position of each of the plurality of audio objects in the 3D space at the given time;
    adjusting, during the second stage audio process and using the second audio processing tool, the gain level of the plurality of audio objects of the audio signal;
    selecting a third multi-channel audio format for encoding gain level adjusted audio objects of the audio signal during the second stage audio process, the third multi-channel audio format being selected based on the type of the second audio processing tool;
    encoding, during the second stage audio process and using the second audio processing tool, the gain level adjusted audio objects of the audio signal, such that the gain level adjusted audio objects of the audio signal are converted to the third multi-channel audio format; and
    outputting the encoded gain level adjusted audio objects of the audio signal to be rendered via a plurality of playback devices.

2. The method of claim 1, wherein the plurality of audio signals are filtered based on a format associated with the audio signal or information included in or excluded from the audio signal.

3. The method of claim 1, wherein the first audio processing tool is selected based on information or content included in or missing from the audio signal and the second audio processing tool is selected based on the selected first audio processing tool.

4. The method of claim 1, wherein the first audio processing tool and the second audio processing tool are selected based on a trained prediction model.

5. The method of claim 1, wherein a first priority is assigned to the first audio processing tool and a second priority is assigned to the second audio processing tool based on a type of the audio signal or information included in or missing from the audio signal, and wherein the first priority is higher than the second priority.

6. One or more non-transitory, computer-readable media storing instructions that, when executed by one or more processors, effectuate operations comprising:
    obtaining a plurality of audio signals;
    filtering the plurality of audio signals, such that an audio signal, from among the plurality of audio signals, corresponding to a multi-channel audio format is allowed to pass through for further processing and one or more other audio signals, from among the plurality of audio signals, corresponding to a single-channel audio format is rejected, the audio signal including a plurality of audio objects;

selecting, from a plurality of audio processing tools, a first audio processing tool and a second audio processing tool;

assigning a priority to each of the first audio processing tool and the second audio processing tool based on information associated with the first audio processing tool and the second audio processing tool, such that the audio signal is processed using an audio processing tool with a higher priority before being processing by another audio processing tool with a lower priority;

in response to a higher priority being assigned to the first audio processing tool, encoding, during a first stage audio process and using the first audio processing tool, the plurality of audio objects of the audio signal such that the plurality of audio objects are converted to a first multi-channel audio format, the first multi-channel audio format representing 3D sound fields;

selecting a second multi-channel audio format for decoding the encoded plurality of audio objects of the audio signal, the second multi-channel audio format being selected based on a type of the second audio processing tool, and the second multi-channel audio format being distinct from the first multi-channel audio format;

decoding, during the first stage audio process and using the first audio processing tool, the plurality of audio objects of the audio signal, such that the plurality of audio objects of the audio signal are decoded to the second multi-channel audio format;

obtaining metadata associated with each of the plurality of audio objects of the audio signal, the metadata indicating a position of each of the plurality of audio objects of the audio signal in a 3D space at a given time;

determining, during a second stage audio process and using the second audio processing tool, a gain level for each of the plurality of audio objects of the audio signal based on the metadata indicating the position of each of the plurality of audio objects in the 3D space at the given time;

adjusting, during the second stage audio process and using the second audio processing tool, the gain level of the plurality of audio objects of the audio signal;

selecting a third multi-channel audio format for encoding gain level adjusted audio objects of the audio signal during the second stage audio process, the third multi-channel audio format being selected based on the type of the second audio processing tool;

encoding, during the second stage audio process and using the second audio processing tool, the gain level adjusted audio objects of the audio signal, such that the gain level adjusted audio objects of the audio signal are converted to the third multi-channel audio format; and outputting the encoded gain level adjusted audio objects of the audio signals to be rendered via a plurality of playback devices.

7. The non-transitory, computer-readable media of claim 6, wherein the plurality of audio signals are filtered based on a format associated with the audio signal or information included in or excluded from the audio signal.

8. The non-transitory, computer-readable media of claim 6, wherein the first audio processing tool is selected based on information or content included in or missing from the audio signal and the second audio processing tool is selected based on the selected first audio processing tool.

9. The non-transitory, computer-readable media of claim 6, wherein the first audio processing tool and the second audio processing tool are selected based on a trained prediction model.

10. The non-transitory, computer-readable media of claim 6, wherein a first priority is assigned to the first audio processing tool and a second priority is assigned to the second audio processing tool based on a type of the audio signal or information included in or missing from the audio signal, and wherein the first priority is higher than the second priority.

11. A method comprising:

obtaining, with a computer system, an audio signal, the audio signal corresponding to a multi-channel audio format;

selecting, with the computer system, from a plurality of audio processing tools, a first audio processing tool and a second audio processing tool;

assigning, with the computer system, a priority to each of the first audio processing tool and the second audio processing tool;

selecting, with the computer system, a first multi-channel audio format based on information associated with the second audio processing tool;

in response to a higher priority being assigned to the first audio processing tool, processing, with the computer system, during a first stage audio process, the audio signal using the first audio processing tool, the processing of the audio signal using the first audio processing tool including converting the audio signal to the selected first multi-channel audio format;

obtaining, with the computer system, metadata associated with the audio signal;

selecting, with the computer system, a second multi-channel audio format based on the information associated with the second audio processing tool, the second multi-channel audio format being distinct from the first multi-channel audio format;

processing, with the computer system, during a second stage audio process, the converted audio signal using the second audio processing tool and based on the metadata, the processing of the converted audio signal using the second audio processing tool including converting the audio signal to the selected second multi-channel audio format; and outputting, with the computer system, the audio signal in the second multi-channel audio format to be rendered via a plurality of playback devices.

12. The method of claim 11, wherein the audio signal includes a plurality of audio objects and wherein the metadata indicates a position of each of the plurality of audio objects in a three-dimensional (3D) space at a given time.

13. The method of claim 11, further comprising:

obtaining a plurality of audio signals; and filtering the plurality of audio signals, such that the audio signal, from among the plurality of audio signals, corresponding to the multi-channel audio format is allowed to pass through for further processing and one or more other audio signals, from among the plurality of audio signals, corresponding to a single-channel audio format is rejected.

14. The method of claim 11, wherein the priority is assigned to each of the first audio processing tool and the second audio processing tool, such that the audio signal is processed using an audio processing tool with a higher priority before being processing by another audio processing tool with a lower priority.

15. The method of claim 11, wherein processing the audio signal using the first audio processing tool includes:

encoding, during the first stage audio process, a plurality of audio objects of the audio signal such that the plurality of audio objects are converted to a third multi-channel audio format, the third multi-channel audio format representing 3D sound fields; and decoding, during the first stage audio process, the plurality of audio objects of the audio signal, such that the plurality of audio objects of the audio signal are decoded to the first multi-channel audio format.

16. The method of claim 11, wherein processing the audio signal using the second audio processing tool includes:

determining, during the second stage audio process, a gain level for each of a plurality of audio objects of the audio signal based on the metadata indicating a position of each of the plurality of audio objects in a 3D space at a given time;

adjusting, during the second stage audio process, the gain level of the plurality of audio objects of the audio signal; and encoding, during the second stage audio process, the gain level adjusted audio objects of the audio signal, such that the gain level adjusted audio objects of the audio signal are converted to the second multi-channel audio format.

17. The method of claim 11, wherein the plurality of audio signals are filtered based on a format associated with the audio signal or information included in or excluded from the audio signal.

18. The method of claim 11, wherein the first audio processing tool is selected based on information or content included in or missing from the audio signal and the second audio processing tool is selected based on the selected first audio processing tool.

19. The method of claim 11, wherein the first audio processing tool and the second audio processing tool are selected based on a trained prediction model.

20. The method of claim 11, wherein a first priority is assigned to the first audio processing tool and a second priority is assigned to the second audio processing tool based on a type of the audio signal or information included in or missing from the audio signal, and wherein the first priority is higher than the second priority.

* * * * *